United States Patent
Koganti

(10) Patent No.: US 9,912,614 B2
(45) Date of Patent: Mar. 6, 2018

(54) INTERCONNECTION OF SWITCHES BASED ON HIERARCHICAL OVERLAY TUNNELING

(71) Applicant: BROCADE COMMUNICATIONS SYSTEMS, INC., San Jose, CA (US)

(72) Inventor: Phanidhar Koganti, Fremont, CA (US)

(73) Assignee: BROCADE COMMUNICATIONS SYSTEMS LLC, San Jose, CA (US)

(*) Notice: Subject to any disclaimer, the term of this patent is extended or adjusted under 35 U.S.C. 154(b) by 111 days.

(21) Appl. No.: 15/005,946

(22) Filed: Jan. 25, 2016

(65) Prior Publication Data

US 2017/0163569 A1    Jun. 8, 2017

Related U.S. Application Data

(60) Provisional application No. 62/264,267, filed on Dec. 7, 2015.

(51) Int. Cl.
| | | |
|---|---|---|
| *H04L 12/947* | (2013.01) | |
| *H04L 12/46* | (2006.01) | |
| *H04L 12/721* | (2013.01) | |
| *H04L 12/741* | (2013.01) | |
| *H04L 12/933* | (2013.01) | |
| *H04L 12/775* | (2013.01) | |

(52) U.S. Cl.
CPC .......... *H04L 49/25* (2013.01); *H04L 12/4633* (2013.01); *H04L 45/66* (2013.01); *H04L 45/58* (2013.01); *H04L 45/74* (2013.01); *H04L 49/10* (2013.01)

(58) Field of Classification Search
CPC ..... H04L 12/4633; H04L 49/10; H04L 49/25; H04L 45/74; H04L 45/58; H04L 45/66
See application file for complete search history.

(56) References Cited

U.S. PATENT DOCUMENTS

| 829,529 A | 8/1906 | Keathley |
|---|---|---|
| 2,854,352 A | 9/1958 | Gronemeyer |
| (Continued) | | |

FOREIGN PATENT DOCUMENTS

| CN | 1735062 | 2/2006 |
|---|---|---|
| CN | 1777149 | 5/2006 |
| (Continued) | | |

OTHER PUBLICATIONS

Eastlake, D. et al., 'RBridges: TRILL Header Options', Dec. 24, 2009, pp. 1-17, TRILL Working Group.

(Continued)

*Primary Examiner* — Dung B Huynh
(74) *Attorney, Agent, or Firm* — Shun Yao; Park, Vaughan, Fleming & Dowler LLP

(57) ABSTRACT

A novel fabric switch is provided. The switch includes a tunnel management apparatus that maintains a local inter-switch tunnel and an inter-fabric tunnel. The local inter-switch tunnel facilitates communication to a switch in a local fabric switch. The inter-fabric tunnel facilitates communication to a remote fabric switch. The switch further includes a packet header management apparatus that decapsulates a packet received from the local inter-switch tunnel and encapsulates the packet with a new tunnel header for transmission over the inter-fabric tunnel.

20 Claims, 17 Drawing Sheets

(56) References Cited

U.S. PATENT DOCUMENTS

| | | | |
|---|---|---|---|
| 5,390,173 | A | 2/1995 | Spinney |
| 5,802,278 | A | 9/1998 | Isfeld |
| 5,878,232 | A | 3/1999 | Marimuthu |
| 5,879,173 | A | 3/1999 | Poplawski |
| 5,959,968 | A | 9/1999 | Chin |
| 5,973,278 | A | 10/1999 | Wehrill, III |
| 5,983,278 | A | 11/1999 | Chong |
| 5,995,262 | A | 11/1999 | Hirota |
| 6,041,042 | A | 3/2000 | Bussiere |
| 6,085,238 | A | 7/2000 | Yuasa |
| 6,092,062 | A | 7/2000 | Lohman |
| 6,104,696 | A | 8/2000 | Kadambi |
| 6,185,214 | B1 | 2/2001 | Schwartz |
| 6,185,241 | B1 | 2/2001 | Sun |
| 6,295,527 | B1 | 9/2001 | McCormack |
| 6,331,983 | B1 | 12/2001 | Haggerty |
| 6,438,106 | B1 | 8/2002 | Pillar |
| 6,498,781 | B1 | 12/2002 | Bass |
| 6,542,266 | B1 | 4/2003 | Phillips |
| 6,553,029 | B1 | 4/2003 | Alexander |
| 6,571,355 | B1 | 5/2003 | Linnell |
| 6,583,902 | B1 | 6/2003 | Yuen |
| 6,633,761 | B1 | 10/2003 | Singhal |
| 6,636,963 | B1 | 10/2003 | Stein |
| 6,771,610 | B1 | 8/2004 | Seaman |
| 6,870,840 | B1 | 3/2005 | Hill |
| 6,873,602 | B1 | 3/2005 | Ambe |
| 6,920,503 | B1 * | 7/2005 | Nanji .................... H04L 63/08 370/351 |
| 6,937,576 | B1 | 8/2005 | DiBenedetto |
| 6,956,824 | B2 | 10/2005 | Mark |
| 6,957,269 | B2 | 10/2005 | Williams |
| 6,975,581 | B1 | 12/2005 | Medina |
| 6,975,864 | B2 | 12/2005 | Singhal |
| 7,016,352 | B1 | 3/2006 | Chow |
| 7,061,877 | B1 | 6/2006 | Gummalla |
| 7,062,177 | B1 | 6/2006 | Grivna |
| 7,097,308 | B2 | 8/2006 | Kim et al. |
| 7,173,934 | B2 | 2/2007 | Lapuh |
| 7,197,308 | B2 | 3/2007 | Singhal |
| 7,206,288 | B2 | 4/2007 | Cometto |
| 7,310,664 | B1 | 12/2007 | Merchant |
| 7,313,637 | B2 | 12/2007 | Tanaka |
| 7,315,545 | B1 | 1/2008 | Chowdhury et al. |
| 7,316,031 | B2 | 1/2008 | Griffith |
| 7,330,897 | B2 | 2/2008 | Baldwin |
| 7,380,025 | B1 | 5/2008 | Riggins |
| 7,397,768 | B1 | 7/2008 | Betker |
| 7,397,794 | B1 | 7/2008 | Lacroute |
| 7,430,164 | B2 | 9/2008 | Bare |
| 7,453,888 | B2 | 11/2008 | Zabihi |
| 7,477,894 | B1 | 1/2009 | Sinha |
| 7,480,258 | B1 | 1/2009 | Shuen |
| 7,508,757 | B2 | 3/2009 | Ge |
| 7,558,195 | B1 | 7/2009 | Kuo |
| 7,558,273 | B1 | 7/2009 | Grosser |
| 7,571,447 | B2 | 8/2009 | Ally |
| 7,599,901 | B2 | 10/2009 | Mital |
| 7,653,056 | B1 | 1/2010 | Dianes |
| 7,688,736 | B1 | 3/2010 | Walsh |
| 7,688,960 | B1 | 3/2010 | Aubuchon |
| 7,690,040 | B2 | 3/2010 | Frattura |
| 7,706,255 | B1 | 4/2010 | Kondrat et al. |
| 7,716,370 | B1 | 5/2010 | Devarapalli |
| 7,720,076 | B2 | 5/2010 | Dobbins |
| 7,729,296 | B1 | 6/2010 | Choudhary |
| 7,787,480 | B1 | 8/2010 | Mehta |
| 7,792,920 | B2 | 9/2010 | Istvan |
| 7,796,593 | B1 | 9/2010 | Ghosh |
| 7,801,021 | B1 | 9/2010 | Triantafillis |
| 7,808,992 | B2 | 10/2010 | Homchaudhuri |
| 7,836,332 | B2 | 11/2010 | Hara |
| 7,843,906 | B1 | 11/2010 | Chidambaram et al. |
| 7,843,907 | B1 | 11/2010 | Abou-Emara |
| 7,860,097 | B1 | 12/2010 | Lovett |
| 7,898,959 | B1 | 3/2011 | Arad |
| 7,912,091 | B1 | 3/2011 | Krishnan |
| 7,924,837 | B1 | 4/2011 | Shabtay |
| 7,937,438 | B1 | 5/2011 | Miller |
| 7,937,756 | B2 | 5/2011 | Kay |
| 7,945,941 | B2 | 5/2011 | Sinha |
| 7,949,638 | B1 | 5/2011 | Goodson |
| 7,957,386 | B1 | 6/2011 | Aggarwal |
| 8,018,938 | B1 | 9/2011 | Fromm |
| 8,027,354 | B1 | 9/2011 | Portolani |
| 8,054,832 | B1 | 11/2011 | Shukla |
| 8,068,442 | B1 | 11/2011 | Kompella |
| 8,078,704 | B2 | 12/2011 | Lee |
| 8,090,805 | B1 | 1/2012 | Chawla |
| 8,102,781 | B2 | 1/2012 | Smith |
| 8,102,791 | B2 | 1/2012 | Tang |
| 8,116,307 | B1 | 2/2012 | Thesayi |
| 8,125,928 | B2 | 2/2012 | Mehta |
| 8,134,922 | B2 | 3/2012 | Elangovan |
| 8,155,150 | B1 | 4/2012 | Chung |
| 8,160,063 | B2 | 4/2012 | Maltz |
| 8,160,080 | B1 | 4/2012 | Arad |
| 8,170,038 | B2 | 5/2012 | Belanger |
| 8,175,107 | B1 | 5/2012 | Yalagandula |
| 8,095,774 | B1 | 6/2012 | Lambeth |
| 8,194,674 | B1 | 6/2012 | Pagel |
| 8,195,774 | B2 | 6/2012 | Lambeth |
| 8,204,061 | B1 | 6/2012 | Sane |
| 8,213,313 | B1 | 7/2012 | Doiron |
| 8,213,336 | B2 | 7/2012 | Smith |
| 8,230,069 | B2 | 7/2012 | Korupolu |
| 8,239,960 | B2 | 8/2012 | Frattura |
| 8,249,069 | B2 | 8/2012 | Raman |
| 8,270,401 | B1 | 9/2012 | Barnes |
| 8,295,291 | B1 | 10/2012 | Ramanathan |
| 8,295,921 | B2 | 10/2012 | Wang |
| 8,301,686 | B1 | 10/2012 | Appajodu |
| 8,339,994 | B2 | 12/2012 | Gnanasekaran |
| 8,351,352 | B1 | 1/2013 | Eastlake |
| 8,369,335 | B2 | 2/2013 | Jha |
| 8,369,347 | B2 | 2/2013 | Xiong |
| 8,392,496 | B2 | 3/2013 | Linden |
| 8,451,717 | B2 | 5/2013 | Srikrishnan |
| 8,462,774 | B2 | 6/2013 | Page |
| 8,465,774 | B2 | 6/2013 | Page |
| 8,467,375 | B2 | 6/2013 | Blair |
| 8,520,595 | B2 | 8/2013 | Yadav |
| 8,553,710 | B1 | 10/2013 | White |
| 8,595,479 | B2 | 11/2013 | Radhakrishnan |
| 8,599,850 | B2 | 12/2013 | J Ha |
| 8,599,864 | B2 | 12/2013 | Chung |
| 8,615,008 | B2 | 12/2013 | Natarajan |
| 8,619,788 | B1 | 12/2013 | Sankaran |
| 8,625,616 | B2 | 1/2014 | Vobbilisetty |
| 8,705,526 | B1 | 4/2014 | Hasan |
| 8,706,905 | B1 | 4/2014 | McGlaughlin |
| 8,717,895 | B2 | 5/2014 | Koponen |
| 8,724,456 | B1 | 5/2014 | Hong |
| 8,792,501 | B1 | 7/2014 | Rustagi |
| 8,798,045 | B1 | 8/2014 | Aybay |
| 8,798,055 | B1 | 8/2014 | An |
| 8,804,732 | B1 | 8/2014 | Hepting |
| 8,804,736 | B1 | 8/2014 | Drake |
| 8,806,031 | B1 | 8/2014 | Kondur |
| 8,826,385 | B2 | 9/2014 | Congdon |
| 8,918,631 | B1 | 12/2014 | Kumar |
| 8,937,865 | B1 | 1/2015 | Kumar |
| 8,948,181 | B2 | 2/2015 | Kapadia |
| 8,971,173 | B1 | 3/2015 | Choudhury |
| 8,995,272 | B2 | 3/2015 | Agarwal |
| 9,019,976 | B2 | 4/2015 | Gupta |
| 9,178,793 | B1 | 11/2015 | Marlow |
| 9,231,890 | B2 | 1/2016 | Vobbilisetty |
| 9,350,680 | B2 | 5/2016 | Thayalan |
| 9,401,818 | B2 | 7/2016 | Venkatesh |
| 9,438,447 | B2 | 9/2016 | Basso |
| 9,524,173 | B2 | 12/2016 | Guntaka |
| 9,626,255 | B2 | 4/2017 | Guntaka |
| 9,628,407 | B2 | 4/2017 | Guntaka |

(56) References Cited

U.S. PATENT DOCUMENTS

| | | |
|---|---|---|
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0026525 A1* | 2/2002 | Armitage .............. H04L 12/185 709/238 |
| 2002/0027885 A1 | 3/2002 | Ben-Ami |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0152075 A1 | 8/2003 | Hawthorne |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0010600 A1 | 1/2004 | Baldwin |
| 2004/0088668 A1 | 1/2004 | Bornowski |
| 2004/0047349 A1 | 3/2004 | Fujita |
| 2004/0049699 A1 | 3/2004 | Griffith |
| 2004/0057430 A1 | 3/2004 | Paavolainen |
| 2004/0081171 A1 | 4/2004 | Finn |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0025179 A1 | 2/2005 | McLaggan |
| 2005/0036488 A1 | 2/2005 | Kalkunte |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0111352 A1 | 5/2005 | Ho |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima |
| 2006/0029055 A1 | 2/2006 | Perera |
| 2006/0034292 A1 | 2/2006 | Wakayama |
| 2006/0034302 A1* | 2/2006 | Peterson ................ H04L 45/04 370/401 |
| 2006/0036648 A1 | 2/2006 | Frey |
| 2006/0036765 A1 | 2/2006 | Weyman |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0092860 A1 | 5/2006 | Higashitaniguchi |
| 2006/0093254 A1 | 5/2006 | Mozdy |
| 2006/0098589 A1 | 5/2006 | Kreeger |
| 2006/0126511 A1 | 6/2006 | Youn |
| 2006/0140130 A1 | 6/2006 | Kalkunte |
| 2006/0155828 A1 | 7/2006 | Ikeda |
| 2006/0159081 A1* | 7/2006 | Dropps ................. H04L 49/357 370/389 |
| 2006/0168109 A1 | 7/2006 | Warmenhoven |
| 2006/0184937 A1 | 8/2006 | Abels |
| 2006/0206655 A1 | 9/2006 | Chappell |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0121617 A1 | 5/2007 | Kanekar |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0230472 A1 | 10/2007 | Jesuraj |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2008/0052487 A1 | 2/2008 | Akahane |
| 2008/0056135 A1 | 3/2008 | Lee |
| 2008/0056300 A1 | 3/2008 | Williams |
| 2008/0057918 A1 | 3/2008 | Abrant |
| 2008/0065760 A1 | 3/2008 | Damm |
| 2008/0075078 A1 | 3/2008 | Watanabe |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens |
| 2008/0159260 A1 | 7/2008 | Vobbilisetty |
| 2008/0159277 A1 | 7/2008 | Vobbilisetty |
| 2008/0165705 A1 | 7/2008 | Umayabashi |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186968 A1 | 8/2008 | Farinacci |
| 2008/0186981 A1 | 8/2008 | Seto |

(56) References Cited

U.S. PATENT DOCUMENTS

| | | |
|---|---|---|
| 2008/0205377 A1 | 8/2008 | Chao |
| 2008/0214175 A1* | 9/2008 | Papadoglou ........ H04L 12/2856 455/422.1 |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0253380 A1 | 10/2008 | Cazares |
| 2008/0267179 A1 | 10/2008 | Lavigne |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0304519 A1 | 12/2008 | Koenen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0037977 A1 | 2/2009 | Gai |
| 2009/0041046 A1 | 2/2009 | Hirata |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0129389 A1* | 5/2009 | Halna DeFretay . H04L 12/4633 370/392 |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0225752 A1 | 9/2009 | Mitsumori |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0246137 A1 | 10/2009 | Hadida |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0279701 A1 | 11/2009 | Moisand |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2009/0328392 | 12/2009 | Tripathi |
| 2010/0002382 A1 | 1/2010 | Aybay |
| 2010/0027420 A1 | 2/2010 | Smith |
| 2010/0027429 A1 | 2/2010 | Jorgens |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0192225 A1 | 7/2010 | Ma |
| 2010/0195489 A1 | 8/2010 | Zhou |
| 2010/0195529 A1 | 8/2010 | Liu |
| 2010/0214913 A1 | 8/2010 | Kompella |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0246580 A1 | 9/2010 | Kaganoi |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290472 A1 | 11/2010 | Raman |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0316055 A1 | 12/2010 | Belanger |
| 2010/0329110 A1 | 12/2010 | Rose |
| 2010/0329265 A1 | 12/2010 | Lapuh |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085562 A1 | 4/2011 | Bao |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134924 A1 | 6/2011 | Hewson |
| 2011/0134925 A1 | 6/2011 | Safrai |
| 2011/0142053 A1 | 6/2011 | VanDerMerwe |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |

(56) References Cited

U.S. PATENT DOCUMENTS

| | | |
|---|---|---|
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0225540 A1 | 9/2011 | d'Entremont |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0055274 A1 | 12/2011 | Hegge |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1 | 2/2012 | Humphries |
| 2012/0033669 A1 | 2/2012 | Mohandas |
| 2012/0033672 A1 | 2/2012 | Page |
| 2012/0039163 A1 | 2/2012 | Nakajima |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243359 A1 | 9/2012 | Keesara |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0281700 A1 | 11/2012 | Koganti |
| 2012/0287785 A1 | 11/2012 | Kamble |
| 2012/0294192 A1 | 11/2012 | Masood |
| 2012/0294194 A1 | 11/2012 | Balasubramanian |
| 2012/0230800 A1 | 12/2012 | Kamble |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003608 A1 | 1/2013 | Lei |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0034094 A1 | 2/2013 | Cardona |
| 2013/0044629 A1 | 2/2013 | Biswas |
| 2013/0058354 A1 | 3/2013 | Casado |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0124707 A1 | 5/2013 | Ananthapadmanabha |
| 2013/0124750 A1 | 5/2013 | Anumala |
| 2013/0127848 A1 | 5/2013 | Joshi |
| 2013/0132296 A1 | 5/2013 | Manfred |
| 2013/0135811 A1 | 5/2013 | Dunwoody |
| 2013/0136123 A1 | 5/2013 | Ge |
| 2013/0145008 A1 | 6/2013 | Kannan |
| 2013/0148546 A1 | 6/2013 | Eisenhauer |
| 2013/0148663 A1 | 6/2013 | Xiong |
| 2013/0156425 A1 | 6/2013 | Kirkpatrick |
| 2013/0194914 A1 | 8/2013 | Agarwal |
| 2013/0201992 A1 | 8/2013 | Masaki |
| 2013/0219473 A1 | 8/2013 | Schaefer |
| 2013/0223221 A1 | 8/2013 | Xu |
| 2013/0223449 A1 | 8/2013 | Koganti |
| 2013/0250951 A1 | 9/2013 | Koganti |
| 2013/0250958 A1 | 9/2013 | Watanabe |
| 2013/0259037 A1 | 10/2013 | Natarajan |
| 2013/0259045 A1* | 10/2013 | Johansson ............ H04L 45/306 370/392 |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Chandra |
| 2013/0301642 A1 | 11/2013 | Radhakrishnan |
| 2013/0308492 A1 | 11/2013 | Baphna |
| 2013/0308647 A1 | 11/2013 | Rosset |
| 2013/0315125 A1 | 11/2013 | Ravishankar |
| 2013/0315586 A1 | 11/2013 | Kipp |
| 2013/0322427 A1 | 12/2013 | Stiekes |
| 2013/0332660 A1 | 12/2013 | Talagala |
| 2013/0336104 A1 | 12/2013 | Talla |
| 2013/0346583 A1 | 12/2013 | Low |
| 2014/0013324 A1 | 1/2014 | Zhang |
| 2014/0019608 A1 | 1/2014 | Kawakami |
| 2014/0025736 A1 | 1/2014 | Wang |
| 2014/0029419 A1 | 1/2014 | Jain |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059111 A1* | 2/2014 | Veeraiyan ............ H04L 67/02 709/201 |
| 2014/0059225 A1 | 2/2014 | Gasparakis |

(56) References Cited

U.S. PATENT DOCUMENTS

| | | |
|---|---|---|
| 2014/0064056 A1 | 3/2014 | Sakata |
| 2014/0071987 A1 | 3/2014 | Janardhanan |
| 2014/0086253 A1 | 3/2014 | Yong |
| 2014/0092738 A1 | 4/2014 | Grandhi |
| 2014/0105034 A1 | 4/2014 | Huawei |
| 2014/0112122 A1 | 4/2014 | Kapadia |
| 2014/0140243 A1 | 5/2014 | Ashwood-Smith |
| 2014/0157251 A1 | 6/2014 | Hocker |
| 2014/0169368 A1* | 6/2014 | Grover ............... H04L 45/64 370/392 |
| 2014/0192804 A1* | 7/2014 | Ghanwani ............ H04L 49/70 370/390 |
| 2014/0241147 A1 | 8/2014 | Rajagopalan |
| 2014/0258446 A1 | 9/2014 | Bursell |
| 2014/0269701 A1 | 9/2014 | Kaushik |
| 2014/0269720 A1 | 9/2014 | Srinivasan |
| 2014/0269733 A1* | 9/2014 | Venkatesh .......... H04L 12/4641 370/395.53 |
| 2014/0298091 A1 | 10/2014 | Carlen |
| 2014/0355477 A1 | 12/2014 | Moopath |
| 2014/0362854 A1 | 12/2014 | Addanki |
| 2014/0362859 A1 | 12/2014 | Addanki |
| 2015/0009992 A1 | 1/2015 | Zhang |
| 2015/0010007 A1 | 1/2015 | Matsuhira |
| 2015/0016300 A1* | 1/2015 | Devireddy .......... H04L 41/0893 370/254 |
| 2015/0030031 A1 | 1/2015 | Zhou |
| 2015/0092593 A1* | 4/2015 | Kompella ............ H04L 45/50 370/254 |
| 2015/0110111 A1 | 4/2015 | Song |
| 2015/0110487 A1 | 4/2015 | Fenkes |
| 2015/0117256 A1* | 4/2015 | Sabaa ................. H04L 49/15 370/254 |
| 2015/0127618 A1 | 5/2015 | Alberti |
| 2015/0139234 A1 | 5/2015 | Hu |
| 2015/0143369 A1 | 5/2015 | Zheng |
| 2015/0172098 A1 | 6/2015 | Agarwal |
| 2015/0188753 A1 | 7/2015 | Anumala |
| 2015/0195093 A1 | 7/2015 | Ramasubramani |
| 2015/0200954 A1* | 7/2015 | Gourlay .............. H04L 49/70 726/4 |
| 2015/0222506 A1 | 8/2015 | Kizhakkiniyil |
| 2015/0248298 A1 | 9/2015 | Gavrilov |
| 2015/0263991 A1 | 9/2015 | Angelo MacChiano |
| 2015/0281066 A1 | 10/2015 | Koley |
| 2015/0301901 A1 | 10/2015 | Rath |
| 2015/0347468 A1 | 12/2015 | Bester |
| 2015/0350069 A1* | 12/2015 | Padgett ............... H04L 45/72 370/236 |
| 2015/0358232 A1* | 12/2015 | Chen .................. H04L 45/72 370/392 |
| 2016/0072899 A1 | 3/2016 | Tung |
| 2016/0087885 A1* | 3/2016 | Tripathi ............. H04W 76/022 370/389 |
| 2016/0139939 A1* | 5/2016 | Bosch ................. H04W 4/003 718/1 |
| 2016/0182458 A1* | 6/2016 | Shatzkamer ........ H04L 63/0428 713/168 |
| 2016/0344640 A1* | 11/2016 | Soderlund ........... H04L 47/2483 |
| 2017/0026197 A1 | 1/2017 | Venkatesh |
| 2017/0097841 A1* | 4/2017 | Chang ................ G06F 9/45558 |

FOREIGN PATENT DOCUMENTS

| | | |
|---|---|---|
| CN | 101064682 | 10/2007 |
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102404181 | 4/2012 |
| CN | 102415065 | 4/2012 |
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 1916807 A2 | 4/2008 |
| EP | 2001167 A1 | 10/2008 |
| EP | 2854352 | 4/2015 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2012093429 | 7/2012 |
| WO | 2014031781 | 2/2014 |

OTHER PUBLICATIONS

Perlman, Radia et al., 'RBridge VLAN Mapping', TRILL Working Group, Dec. 4, 2009, pp. 1-12.

Touch, J. et al., 'Transparent Interconnection of Lots of Links (TRILL): Problem and Applicability Statement', May 2009, Network Working Group, pp. 1-17.

Switched Virtual Networks. 'Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.

Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].

Office Action dated Jun. 18, 2015, U.S. Appl. No. 13/098,490, filed May 2, 2011.

Perlman R: 'Challenges and opportunities in the design of TRILL: a routed layer 2 technology', 2009 IEEE GLOBECOM Workshops, Honolulu, HI, USA, Piscataway, NJ, USA, Nov. 30, 2009 (Nov. 30, 2009), pp. 1-6, XP002649647, DOI: 10.1109/GLOBECOM.2009. 5360776 ISBN: 1-4244-5626-0 [retrieved on Jul. 19, 2011].

TRILL Working Group Internet-Draft Intended status: Proposed Standard RBridges: Base Protocol Specificaiton Mar. 3, 2010.

Office Action dated Jun. 16, 2015, U.S. Appl. No. 13/048,817, filed Mar. 15, 2011.

Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004 (Jun. 1, 2004), pp. 124-131, XP001198207, ISSN:0163-6804, DOI: 10.1109/MCOM.2004.1304248.

Office Action for U.S. Appl. No. 13/092,873, filed Apr. 22, 2011, dated Nov. 29, 2013.

Perlman, Radia et al., 'RBridges: Base Protocol Specification; Draft-ietf-trill-rbridge-protocol-16.txt', Mar. 3, 2010, pp. 1-117.

'An Introduction to Brocade VCS Fabric Technology', Brocade white paper, http://community.brocade.com/docs/DOC-2954, Dec. 3, 2012.

Brocade, 'Brocade Fabrics OS (FOS) 6.2 Virtual Fabrics Feature Frequently Asked Questions', pp. 1-6, 2009 Brocade Communications Systems, Inc.

Brocade, 'FastIron and TurboIron 24x Configuration Guide', Feb. 16, 2010.

Brocade, 'The Effortless Network: Hyperedge Technology for the Campus LAN' 2012.

(56) References Cited

OTHER PUBLICATIONS

Brocade 'Brocade Unveils 'The Effortless Network'', http://newsroom.brocade.com/press-releases/brocade-unveils-the-effortless-network-nasdaq-brcd-0859535, 2012.
Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Knight, 'Network Based IP VPN Architecture using Virtual Routers', May 2003.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Lapuh, Roger et al., 'Split Multi-Link Trunking (SMLT)', Network Working Group, Oct. 2012.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-narten-n vo3-over l ay-problem-statement-01', Oct. 31, 2011.
Office Action for U.S. Appl. No. 13/092,752, filed Apr. 22, 2011, from Park, Jung H., dated Jul. 18, 2013.
Office Action for U.S. Appl. No. 13/351,513, filed Jan. 17, 2012, dated Jul. 24, 2014.
Office Action for U.S. Appl. No. 13/365,993, filed Feb. 3, 2012, from Cho, Hong Sol., dated Jul. 23, 2013.
Office Action for U.S. Appl. No. 13/742,207 dated Jul. 24, 2014, filed Jan. 15, 2013.
Office Action for U.S. Appl. No. 12/725,249, filed Mar. 16, 2010, dated Apr. 26, 2013.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/365,808, filed Jul. 18, 2013, dated Jul. 18, 2013.
Perlman, Radia et al., 'Challenges and Opportunities in the Design of TRILL: a Routed layer 2 Technology', 2009.
S. Nadas et al., 'Virtual Router Redundancy Protocol (VRRP) Version 3 for IPv4 and IPv6', Internet Engineering Task Force, Mar. 2010.
'RBridges: Base Protocol Specification', IETF Draft, Perlman et al., Jun. 26, 2009.
U.S. Appl. No. 13/030,806 Office Action dated Dec. 3, 2012.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Aug. 14, 2014, U.S. Appl. No. 13/092,460, filed Apr. 22, 2011.

(56) References Cited

OTHER PUBLICATIONS

Office action dated Jan. 28, 2013, U.S. Appl. No. 13/092,701, filed Apr. 22, 2011.
Office Action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office Action dated Apr. 9, 2014, U.S. Appl. No. 13/092,752, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Jul. 7, 2014, for U.S. Appl. No. 13/044,326, filed Mar. 9, 2011.
Office action dated Oct. 2, 2013, U.S. Appl. No. 13/044,326, filed Mar. 9, 2011.
Office Action dated Dec. 19, 2014, for U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Brocade 'An Introduction to Brocade VCS Fabric Technology', Dec. 3, 2012.
Huang, Nen-Fu et al., 'An Effective Spanning Tree Algorithm for a Bridged LAN', Mar. 16, 1992.
Lapuh, Roger et al., 'Split Multi-link Trunking (SMLT) draft-lapuh-network-smlt-08', Jan. 2009.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/030,688, filed Feb. 18, 2011, dated Jul. 17, 2014.
Office Action for U.S. Appl. No. 13/042,259, filed Mar. 7, 2011, from Jaroenchonwanit, Bunjob, dated Jan. 16, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/950,974, filed Nov. 19, 2010, from Haile, Awet A., dated Dec. 2, 2012.
Office Action for U.S. Appl. No. 12/725,249, filed Mar. 16, 2010, dated Sep. 12, 2012.
Office Action for U.S. Appl. No. 13/098,490, filed May 2, 2011, dated Dec. 21, 2012.
Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/044,301, dated Mar. 9, 2011.
Office Action for U.S. Appl. No. 13/087,239, filed Apr. 14, 2011, dated Dec. 5, 2012.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Office Action for U.S. Appl. No. 13/184,526, filed Jul. 16, 2011, dated Jan. 5, 2015.
Office Action for U.S. Appl. No. 13/184,526, filed Jul. 16, 2011, dated Dec. 2, 2013.
Office Action for U.S. Appl. No. 13/351,513, filed Jan. 17, 2012, dated Feb. 28, 2014.
Office Action for U.S. Appl. No. 13/533,843, filed Jun. 26, 2012, dated Oct. 21, 2013.
Office Action for U.S. Appl. No. 13/598,204, filed Aug. 29, 2012, dated Jan. 5, 2015.
Office Action for U.S. Appl. No. 13/598,204, filed Aug. 29, 2012, dated Feb. 20, 2014.

(56) References Cited

OTHER PUBLICATIONS

Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/092,887, dated Jan. 6, 2014.
Zhai F. Hu et al. 'RBridge: Pseudo-Nickname; draft-hu-trill-pseudonode-nickname-02.txt', May 15, 2012.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office Action for U.S. Appl. No. 13/092,460, filed Apr. 22, 201, dated Mar. 13, 2015.
Office Action for U.S. Appl. No. 13/092,752, filed Apr. 22, 2011, dated Feb. 27, 2015.
Office Action for U.S. Appl. No. 13/425,238, filed Mar. 20, 2012, dated Mar. 12, 2015.
Office Action for U.S. Appl. No. 13/786,328, filed Mar. 5, 2013, dated Mar. 13, 2015.
Office Action for U.S. Appl. No. 14/577,785, filed Dec. 19, 2014, dated Apr. 13, 2015.
Rosen, E. et al., "BGP/MPLS VPNs", Mar. 1999.
Office action dated Jun. 8, 2015, U.S. Appl. No. 14/178,042, filed Feb. 11, 2014.
Office Action dated May 21, 2015, U.S. Appl. No. 13/288,822, filed Nov. 3, 2011.
Office action dated Apr. 30, 2015, U.S. Appl. No. 13/351,513, filed Jan. 17, 2012.
Office Action dated Apr. 1, 2015 U.S. Appl. No. 13/656,438 filed Oct. 19, 2012.
Office Action Dated Jun. 10, 2015, U.S. Appl. No. 13/890,150, filed May 8, 2013.
Mahalingam "VXLAN: A Framework for Overlaying Virtualized Layer 2 Networks over Layer 3 Networks" Oct. 17, 2013 pp. 1-22, Sections 1, 4 and 4.1.
Siamak Azodolmolky et al. "Cloud computing networking: Challenges and opportunities for innovations", IEEE Communications Magazine, vol. 51, No. 7, Jul. 1, 2013.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438 filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF—Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
"Network based IP VPN Architecture using Virtual Routers" Paul Knight et al.
Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office Action for U.S. Appl. No. 14/817,097, dated May 4, 2017.
Office Action for U.S. Appl. No. 14/872,966, dated Apr. 20, 2017.
Office Action for U.S. Appl. No. 14/680,915, dated May 3, 2017.
Office Action for U.S. Appl. No. 14/792,166, dated Apr. 26, 2017.
Office Action for U.S. Appl. No. 14/660,803, dated May 17, 2017.
Office Action for U.S. Appl. No. 14/488,173, dated May 12, 2017.
Office Action for U.S. Appl. No. 13/288,822, dated May 26, 2017.
Office Action for U.S. Appl. No. 14/329,447, dated Jun. 8, 2017.
Office Action for U.S. Appl. No. 14/662,095, dated Mar. 24, 2017.
Office Action for U.S. Appl. No. 15/005,967, dated Mar. 31, 2017.
Office Action for U.S. Appl. No. 15/215,377, dated Apr. 7, 2017.
Office Action for U.S. Appl. No. 13/098,490, dated Apr. 6, 2017.
Office Action for U.S. Appl. No. 14/662,092, dated Mar. 29, 2017.

(56) References Cited

OTHER PUBLICATIONS

Office Action for U.S. Appl. No. 14/510,913, dated Jun. 30, 2017.
Office Action for U.S. Appl. No. 15/005,946, dated Jul. 14, 2017.
Office Action for U.S. Appl. No. 13/092,873, dated Jul. 19, 2017.
Office Action for U.S. Appl. No. 15/047,539, dated Aug. 7, 2017.
Office Action for U.S. Appl. No. 14/830,035, dated Aug. 28, 2017.
Office Action for U.S. Appl. No. 13/098,490, dated Aug. 24, 2017.
Office Action for U.S. Appl. No. 13/786,328, dated Aug. 21, 2017.

* cited by examiner

INTERCONNECTION OF SWITCHES BASED ON HIERARCHICAL OVERLAY TUNNELING

RELATED APPLICATION

This application claims the benefit of U.S. Provisional Application No. 62/264,267, titled "Interconnection of Switches Based on Hierarchical Overlay Tunneling," by inventor Phanidhar Koganti, filed 7 Dec. 2015, the disclosure of which is incorporated by reference herein.

BACKGROUND

Field

This disclosure relates to communication networks. More specifically, the present disclosure relates to a system and method for a constructing a scalable switching system based on hierarchical overlay tunneling.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities, such as network virtualization and multi-tenancy, to accommodate diverse network demands efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

One way to increase the throughput of a switch system is to use layer-2 switch stacking. In switch stacking, multiple smaller-scale, identical switches are interconnected in a special pattern to form a larger logical switch. However, switch stacking requires careful configuration of the ports and inter-switch links. The amount of required manual configuration becomes prohibitively complex and tedious when the stack reaches a certain size, which precludes switch stacking from being a practical option in building a large-scale switching system. Furthermore, a system based on stacked switches often has topology limitations which restrict the scalability of the system due to bandwidth considerations.

A flexible way to improve the scalability of a switch system is to build an interconnection of switches that can be controlled in a cohesive way, these switches can often share a single logical chassis, or a single control plane (referred to as "fabric switch"). A fabric switch is a collection of individual member switches. These member switches form a network of interconnected switches that can have an arbitrary number of ports and an arbitrary topology. As demands grow, customers can adopt a "pay as you grow" approach to scale up the capacity of the fabric switch.

While a fabric switch brings desirable features, some issues remain unsolved in efficient formation and data transportation of a scalable fabric switch. One challenge that remains is that as layer-2 networks become more ubiquitous, extended layer-2 broadcast domains are hosting an increasing number of medium-access-control (MAC) addresses. In addition, the emergence of cloud computing based on virtual machines exacerbates the grown of the number of MAC addresses. How to manage such a large number of MAC addresses, while providing the capability of handling a large amount of layer-2 traffic, remains a main challenge for network equipment vendors.

SUMMARY

One embodiment of the present invention provides a switch. The switch includes a tunnel management apparatus that maintains a local inter-switch tunnel and an inter-fabric tunnel. The local inter-switch tunnel facilitates communication to a switch in a local fabric switch. The inter-fabric tunnel facilitates communication to a remote fabric switch. The switch further includes a packet header management apparatus that decapsulates a packet received from the local inter-switch tunnel and encapsulates the packet with a new tunnel header for transmission over the inter-fabric tunnel.

In a variation on this embodiment, the switch manages an edge tunnel which facilitates communication with an end host.

In a variation on this embodiment, the new tunnel header includes an identifier for a destination remote fabric switch.

In a variation on this embodiment, the new tunnel header includes a network service header In a variation on this embodiment, the switch stores a mapping between a medium access control (MAC) address and a virtual tunnel endpoint.

In a variation on this embodiment, the switch stores a mapping between a MAC address and a remote fabric identifier.

In a variation on this embodiment, the switch precludes a packet received from an intra-fabric tunnel from being forwarded onto another intra-fabric tunnel.

In a variation on this embodiment, the switch loads a MAC address in the forwarding hardware of the switch in response to identifying the MAC address in a packet.

BRIEF DESCRIPTION OF THE FIGURES

In the figures, like reference numerals refer to the same figure elements.

DETAILED DESCRIPTION

Figure 1A:
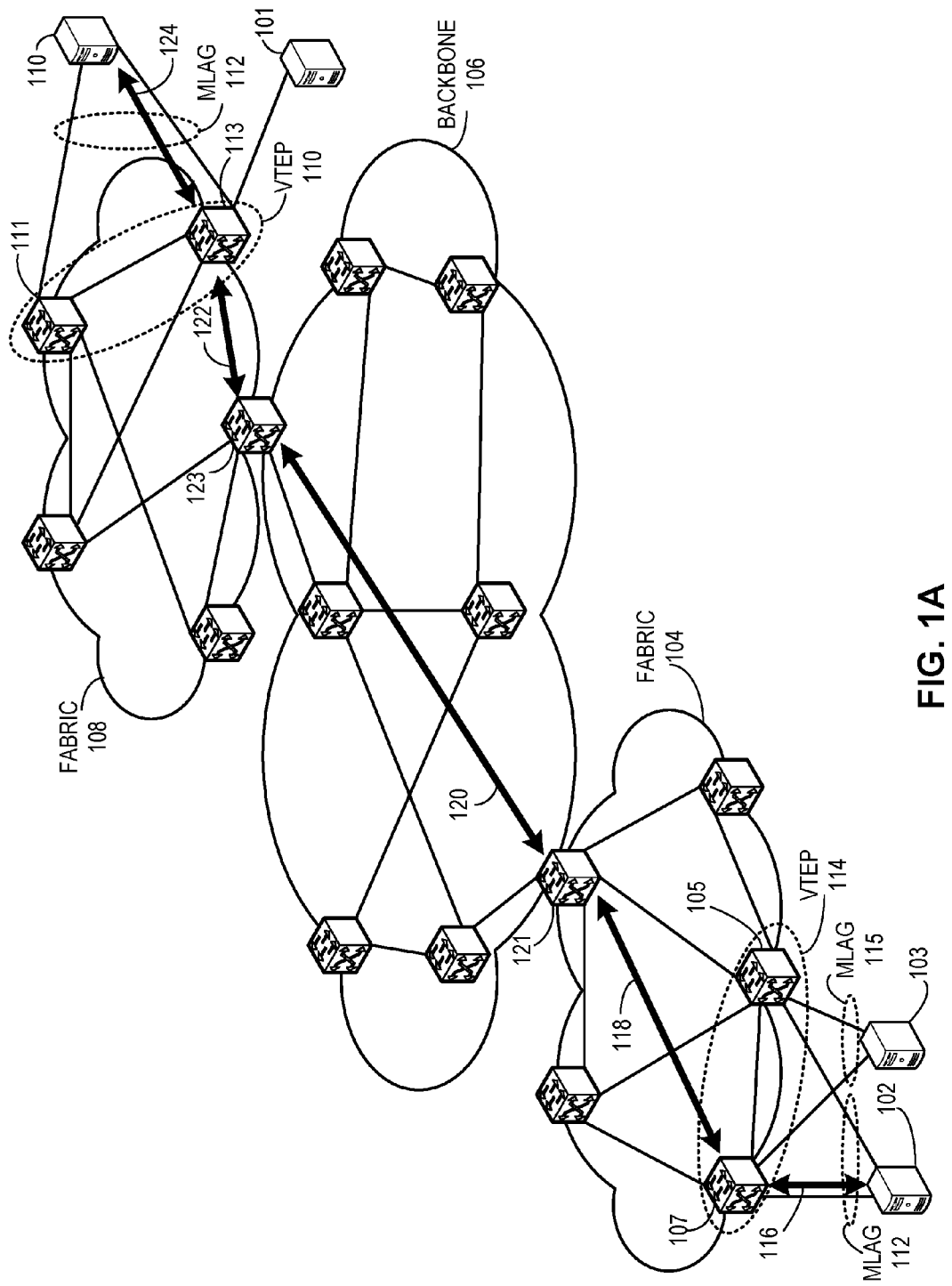
FIG. 1A illustrates an exemplary fabric switch architecture, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of building a versatile, cost-effective, and scalable layer-2 switching system is solved by forming a topology agnostic fabric switch based on an underlay layer-3 protocol with hierarchical overlay tunneling. This new fabric switch architecture can include one or more fabric switches, interconnected by an underlay network that can be based on existing layer-3 and tunneling protocols, such as IP and virtual extensible LAN (VXLAN), as well as proprietary protocols. Each fabric switch can include a number of physical switches, interconnected by a similar underlay network using the same layer-3 and tunneling protocols. As described in more details in later sections of this disclosure, the problem of handling a large number of MAC address in an extended layer-2 broadcast domain is solved by having a hierarchical tunneling mechanism and a label-based fabric-wise address aggregation mechanism.

Within a fabric switch, a fully meshed logical topology can be established among all the switches using the underlay tunneling protocol. In other words, any two switches within a fabric can communicate with each other via a direct logical link, or intra-fabric tunnel, based on this fully meshed logical topology. In particular, when these switches implement layer-2 functionalities, they can form an Ethernet fabric. As a result, an Ethernet broadcast domain can reach every switch within the fabric based on this fully meshed logical topology.

When multiple fabric switches are interconnected, and a layer-2 broadcast domain is extended across more than one fabric switch, inter-fabric tunnels can be established to facilitate inter-fabric communication. Packets leaving one fabric can be encapsulated in these inter-fabric tunnels, and transported to the remote fabric. Each fabric can have one or more inter-fabric gateways, which can be responsible for maintaining these inter-fabric tunnels.

One challenge is building a large layer-2 broadcast domain is how to manage a large number of MAC address that are expected to be reachable within the broadcast domain, and the associated MAC address learning. One way to solve this problem is to associate all the MAC address within a fabric switch with a label for this fabric, which can also function as an identifier for the fabric. When an Ethernet packet enters a fabric, its destination address (DA) is mapped to the corresponding destination fabric's label, and forwarded toward the remote fabric based on this destination fabric's label. Once the packet reaches the destination fabric, it is decapsulated from the inter-fabric tunnel, and forwarded toward the destination egress switch using an intra-fabric tunnel.

There are a number of ways to establish the mapping relationship between a MAC DA and a fabric ID (i.e., the fabric's label). This mapping can be done in the data plane by learning from an initial broadcast packet, during which process a packet's MAC source address (SA) is mapped to its source fabric ID. This information can also be distributed in the control plane, using a control protocol, when one or more MAC addresses are associated with a remote fabric. A third approach is to use a combination of both data-plane and control-plane based methods, which allows a local fabric to learn the MAC-to-fabric-ID mapping in a remote fabric based on local learning and/or a control-plane message.

The aforementioned hierarchical overlay tunneling mechanism and the label-based address aggregation mechanism can provide a versatile and scalable fabric switching solution that solves many of the challenges present in the current fabric architectures.

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary physical topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

It should also be noted that a fabric switch is distinct from a VLAN. A fabric switch can accommodate a plurality of VLANs. A VLAN is typically identified by a VLAN tag. In contrast, the fabric switch is identified by a fabric identifier (e.g., a cluster identifier), which is assigned to the fabric switch. Since a fabric switch can be represented as a logical chassis, the fabric identifier can also be referred to as a logical chassis identifier. A respective member switch of the fabric switch is associated with the fabric identifier. In some embodiments, a fabric switch identifier is pre-assigned to a member switch. As a result, when the switch joins a fabric switch, other member switches identifies the switch to be a member switch of the fabric switch.

In this disclosure, the term "fabric switch" refers to a number of interconnected physical switches which can form a single, scalable network of switches. The member switches of the fabric switch can operate as individual switches. The member switches of the fabric switch can also operate as a single logical switch in the provision and control plane, the data plane, or both. "Fabric switch" should not be interpreted as limiting embodiments of the present invention to a plurality of switches operating as a single, logical switch. In this disclosure, the terms "fabric switch" and "fabric" are used interchangeably.

Although the present disclosure is presented using examples based on an encapsulation protocol, embodiments of the present invention are not limited to networks defined using one particular encapsulation protocol associated with a particular Open System Interconnection Reference Model (OSI reference model) layer. For example, embodiments of the present invention can also be applied to a multi-protocol label switching (MPLS) network. In this disclosure, the term "encapsulation" is used in a generic sense, and can refer to encapsulation in any networking layer, sub-layer, or a combination of networking layers.

The term "end host" can refer to any device external to a network (e.g., does not perform forwarding in that network). Examples of an end host include, but are not limited to, a physical or virtual machine, a conventional layer-2 switch, a layer-3 router, or any other type of network device. Additionally, an end host can be coupled to other switches or hosts further away from a layer-2 or layer-3 network. An end host can also be an aggregation point for a number of network devices to enter the network. An end host hosting one or more virtual machines can be referred to as a host machine. In this disclosure, the terms "end host" and "host machine" are used interchangeably.

The term "VLAN" is used in a generic sense, and can refer to any virtualized network. Any virtualized network comprising a segment of physical networking devices, software network resources, and network functionality can be can be referred to as a "VLAN." "VLAN" should not be interpreted as limiting embodiments of the present invention to layer-2 networks. "VLAN" can be replaced by other terminologies referring to a virtualized network or network segment, such as "Virtual Private Network (VPN)," "Virtual Private LAN Service (VPLS)," or "Easy Virtual Network (EVN)."

The term "packet" refers to a group of bits that can be transported together across a network. "Packet" should not be interpreted as limiting embodiments of the present invention to layer-3 networks. "Packet" can be replaced by other terminologies referring to a group of bits, such as "frame," "cell," or "datagram."

The term "switch" is used in a generic sense, and can refer to any standalone or fabric switch operating in any network layer. "Switch" can be a physical device or software running on a computing device. "Switch" should not be interpreted as limiting embodiments of the present invention to layer-2 networks. Any device that can forward traffic to an external device or another switch can be referred to as a "switch." Examples of a "switch" include, but are not limited to, a layer-2 switch, a layer-3 router, a TRILL RBridge, or a fabric switch comprising a plurality of similar or heterogeneous smaller physical switches.

The term "edge port" refers to a port on a network which exchanges data frames with a device outside of the network (i.e., an edge port is not used for exchanging data frames with another member switch of a network). The term "inter-switch port" refers to a port which sends/receives data frames among member switches of the network. A link between inter-switch ports is referred to as an "inter-switch link." The terms "interface" and "port" are used interchangeably.

The term "switch identifier" refers to a group of bits that can be used to identify a switch. Examples of a switch identifier include, but are not limited to, a media access control (MAC) address, an Internet Protocol (IP) address, an RBridge identifier, or a combination thereof. In this disclosure, "switch identifier" is used as a generic term, is not limited to any bit format, and can refer to any format that can identify a switch.

The term "tunnel" refers to a data communication where one or more networking protocols are encapsulated using another networking protocol. Although the present disclosure is presented using examples based on a layer-3 encapsulation of a layer-2 protocol, "tunnel" should not be interpreted as limiting embodiments of the present invention to layer-2 and layer-3 protocols. A "tunnel" can be established for and using any networking layer, sub-layer, or a combination of networking layers.

An "intra-fabric tunnel" refers to a tunnel established between switches belonging to a common fabric switch. An "inter-fabric tunnel" refers to a tunnel established between two fabric switches, typically between two backbone nodes residing in respective fabrics. An "edge tunnel" is a tunnel established between a switch and an end host.

Network Architecture

FIG. 1A illustrates an exemplary fabric switch architecture, in accordance with an embodiment of the present invention. In this example, the architecture includes a fabric switch 104, a backbone fabric switch 106, and a fabric switch 108. Here, fabric switches 104 and 108 are coupled to end hosts via edge ports, and hence, can be referred to as edge fabric switches.

Fabric switch 104 includes a number of switches, such as switches 105 and 107. In one embodiment, each switch within fabric 104 can form an intra-fabric tunnel with every other switch within the same fabric, thereby achieving a fully meshed logical topology. Various tunneling techniques can be used. For example, a tunnel can be established using the VXLAN protocol. Other tunneling protocols, such as generic routing encapsulation (GRE), layer-2 tunneling protocol (L2TP), multi-protocol label switching (MPLS), etc., can also be used to establish the intra-fabric tunnels. As a result of this fully-meshed logical topology, any switch within fabric 104 can reach another switch in the same fabric with only one hop through the corresponding tunnel. In the case where VXLAN is used as a tunneling protocol, a tunnel can be identified by the tuple {source_IP, destination_IP, source_port, destination_port}, where source_IP is the source switch's IP address, destination_IP is the destination swtich's IP address, source_port is the source switch's UDP port, and destination_port is the destination switch's UDP port (since VXLAN uses UDP as a transport-layer protocol). Other ways for identifying the tunnels are also possible. In some embodiments, source_port is generated from a hash value of one of fields in the tuple.

An end host 102 can be coupled to fabric 104 via a multi-chassis link aggregation group (MLAG) 112, which is a logical link that includes two physical links coupling switches 107 and 105, respectively. MLAG 112 provides a physical-link redundancy for end host 102. If one of the two links fails, the other link can remain operational. In addition, switch 107 and 105 can form a virtual tunnel endpoint (VTEP) 114, which can present itself as a virtual switch with a virtual IP address. In some embodiments, end host 102 can form an edge tunnel 116 with VTEP 114. For end host 102, VTEP 114 can function like any other switch in fabric 104, and MLAG 112 can function like a regular link for purposes of forwarding traffic from and to end host 102.

During operation, edge tunnel 116 may be established between end host 102 and switch 107. If a failure occurs, tunnel 116 can be moved to the working link with minimal disruption to transmission. Similarly, an end host 103 can be coupled to fabric 104 via an MLAG 115, which is a logical link that includes two physical links coupling switches 107 and 105, respectively. The same VTEP 114 can receive and forward packets via MLAGs 112 and 115. As a result, the virtual IP address of VTEP 114 can serve as the VTEP address for both MLAGs 112 and 115.

Note that fabric switch 104 can function as a logical layer-2 switch, which allows multiple end hosts connected to fabric 104 to be on a common Ethernet broadcast domain, as long as these end hosts are configured with a common VLAN. Also note that an end host may be a physical host, or may be a machine hosting multiple virtual machines. Furthermore, a hypervisor that controls multiple virtual machines on a physical host can include a virtual switch. This virtual switch can be part of fabric switch 104, and establish intra-fabric tunnels with every other switch in fabric 104, thereby being part of the full-mesh logical topology.

As shown in the example in FIG. 1A, backbone network 106 can interconnect multiple fabric switches, such as fabric 104 and fabric 108. Fabric 104 can include a switch 121, which participates in both fabric 104 and backbone fabric 106 (or backbone 106). Such a switch can be referred to as a backbone node. Similarly, fabric 108 can include a backbone node 123, which participates in both fabric 108 and backbone 106. For traffic between fabric 104 and fabric 106, an inter-fabric tunnel 120 can be established between switch 121 and switch 123. Inter-fabric tunnel 120 allows the Ethernet broadcast domain in fabric 104 to be extended to fabric 108. In this example, similar to end host 102, an end host 110 is coupled to fabric 108 using an MLAG 112. MLAG 112 can be formed between end host 110 and switches 111 and 113. Switches 111 and 113 jointly form a VTEP 110. In one embodiment, end host 110 forms an edge tunnel 124 with VTEP 110.

In a conventional switched Ethernet network, a switch forwards a received Ethernet packet based on its MAC DA, assuming that the switch has previously learned which output port to use for that MAC DA, based on prior packets originated from that MAC DA. However, in an extended Ethernet broadcast domain that spans over multiple fabric switches, such as fabrics 104 and 108, it might be impossible for a single switch to maintain reachability information for all the MAC addresses associated with a broadcast domain, especially when an end host can accommodate multiple virtual machines. Also, forwarding based only on MAC DA can have a similar scalability problem because of the large MAC address space.

To solve these problems, in some embodiments of the present invention, each fabric is identified by a unique label, or identifier. A source fabric label and destination fabric label can be included in the tunnel encapsulation header. For intra-fabric traffic, i.e., packets whose MAC SA and MAC DA both reside in the same fabric, the packet's source fabric label and destination fabric label are the same. When a switch receives a packet from an intra-fabric tunnel, the switch can inspect the destination fabric label. If the label is the same as the local fabric's label, the switch can decapsulate the packet from the tunnel header, and forward the Ethernet packet based on its MAC DA. If the packet's destination fabric label is not the local fabric's label, the switch can decapsulate the packet, re-encapsulate the packet in an inter-fabric tunnel header, and transmit the packet via the appropriate inter-fabric tunnel.

For example, suppose that end host 102 sends a packet to end host 110. Assume also that end host 102 does not contain a virtual switch that participates in fabric 104. End host 102 would generate an Ethernet packet, which can include an inner IP packet for end host 110, with end host 110's MAC address as its MAC DA, and sends the packet via edge tunnel 116. Note that at this point the packet does not contain any fabric label information. When the packet arrives at switch 107, which functions as an ingress switch for fabric 104, switch 107 decapsulates the packet and inspects its MAC DA. Switch 107 then determines that the MAC DA corresponds to fabric 108 (mechanisms for distributing the MAC-to-fabric-label mapping information are described in more details in later sections of this disclosure).

Accordingly, switch 107 determines that the packet would need to be sent to backbone node 121, since the packet is destined to a remote fabric. Switch 107 then encapsulates the packet with a tunnel header that includes fabric 104's label as its source fabric label, and fabric 108's label as its destination label, and transmits the packet onto intra-fabric tunnel 118, which leads to backbone node 121. Fabric 104 can also facilitate separation of customer traffic. For example, if end hosts 102 and 103 belong to two different customers, fabric 104 can allocate separate tunnels segments of tunnel 118 for traffic from end hosts 102 and 103. Switches 105 and 107 can map service and customer VLAN identifiers of end hosts 102 and 103 to respective tunnel segment identifiers. In some embodiments, tunnel 118 is a VXLAN tunnel and a tunnel segment identifier is a VXLAN network identifier (VNI).

After receiving the packet, switch 121 first inspects the packet's tunnel header to determine the destination fabric label. Because the destination fabric label is not the same as the fabric 104's label, switch 121 decapsulates the packet from the header for intra-fabric tunnel 118, and encapsulates the packet in a new tunnel header for inter-fabric tunnel 120, which leads to backbone node 123 for fabric 108. Note that the new tunnel header also indicates fabric 108's label as the destination fabric label. Switch 121 then transmits the packet onto inter-fabric tunnel 120.

When switch 123 receives the packet, switch 123 inspects the packet's destination fabric label, which is the same as fabric 108's label. Switch 123 then determines that the packet is destined to a MAC address within fabric 108. Accordingly, switch 123 decapsulates the packet and inspects the inner Ethernet's MAC DA, which is the MAC address for end host 110. Based on this MAC DA, switch determines that the packet should be sent to egress switch 113. Correspondingly, switch 123 encapsulates the packet with a tunnel header corresponding to intra-fabric tunnel 122, and sends the packet onto tunnel 122.

Subsequently, when the packet arrives at switch 113, switch 113 determines that the destination fabric label is the same label for fabric 108. Hence, switch 113 decapsulates the packet and looks up the inner Ethernet packet's MAC DA. As a result of the look-up, switch 113 determines that the packet is destined to end host 110, which is coupled to VTEP 110 via tunnel 124. Accordingly, switch 113 encapsulates the packet with a tunnel header corresponding to tunnel 124, and delivers the packet to end host 110. If the packet were destined for end host 101, which is coupled to fabric 108 via an edge port without a tunnel (e.g., tunnel 124), switch 113 would have forwarded the packet to end host 101 via the edge port based on the MAC DA without encapsulating the packet.

In some embodiments, switch 113 can operate as the IP gateway for end host 101 (e.g., the gateway address provided by a Dynamic Host Configuration Protocol (DHCP) server). As a result, Ethernet frames from end host 101 can be destined to switch 113. Suppose that end host 101 sends a packet to end host 102. End host 101 encapsulates the packet in an Ethernet header and sends the Ethernet frame to switch 113. Upon receiving the frame, switch 113 removes the Ethernet header and promotes the payload, which is the IP packet, for layer-3 processing. A switch in a fabric switch can maintain forwarding information mapped to an IP address of an end host as well as the MAC address. Hence, switch 113 can forward the packet to end host 102 via tunnel 122 based on the forwarding information mapped to the IP address of end host 102.

Note that in the above example use case, the backbone nodes are individual switches. In some embodiments, the backbone node can also be a distributed, virtual switch, similar to VTEP 114 and VTEP 110. In addition, there can be multiple backbone nodes in a fabric. One backbone node may be responsible for forwarding traffic to one subset of remote fabrics, and another backbone node may be responsible for forwarding traffic another subset remote fabrics. Furthermore, Distribution of Reachability Information and Loop Prevention As mentioned above, in general, there can be three hierarchies of overlay tunnels above the underlay network, namely edge tunnels, intra-fabric tunnels, and inter-fabric tunnels. In addition, once a packet enters a fabric, the packet is transported through tunnels, with its tunnel header carrying a source fabric label and destination fabric label. Forwarding of the fabric between tunnels can be done based on the destination fabric label.

When a packet enters a fabric via an ingress switch, this ingress switch is responsible for generating the packet's tunnel header, which includes the source and destination fabric labels. Hence, the ingress switch ideally can maintain a set of mapping information that maps a MAC DA to a fabric label (the fabric label can be the label of the local fabric, or a remote fabric).

For all the MAC address within the local fabric, this MAC-to-fabric-label mapping information can be acquired through MAC address learning. That is, when an end host sends an Ethernet packet to the fabric, the ingress switch can establish a mapping relationship between the Ethernet's MAC SA and the local fabric's label. This mapping information can then be shared among all the switches in the local fabric, thereby allowing future packets with the same MAC as its DA to be forwarded to the end host.

For MAC address associated with a remote fabric, one approach for establishing the MAC-to-fabric-label mapping is to learn the mapping in the data plane, similar to intra-fabric MAC learning. This method, however, might be slow and not scalable, because it depends on previously observed traffic. Before the complete mapping information can be established, packets with unknown MAC DAs would have to be broadcast to the entire broadcast domain (which can include both the local and remote fabrics). As a result, a large amount of traffic flooding could occur.

A second approach to distribute the MAC-to-fabric-label mapping information for MAC addresses located in a remote fabric is to use a distribution protocol in the control plane. For example, with reference to FIG. 1A, when a number of MAC addresses are allocated (e.g., with the deployment of a number of virtual machines) in fabric 108, these MAC addresses and fabric 108's label can be distributed to all the switches in fabric 104 via a control-information distribution protocol. This distribution method can reduce the amount of flooding required for learning unknown MAC addresses. In one embodiment, the Multiprotocol Border Gateway Protocol Ethernet Virtual Private Network (MPBGP-EVPN) protocol can be used to distribute the MAC-to-fabric-label mapping information for a group of MAC addresses in a remote fabric. Details of MPBGP-EVPN can be found at https://tools.ietf.org/html/rfc7432, the disclosure of which is incorporated in its entirety herein. Note that the mapping distribution messages can be sent regularly, or on an as-needed basis. For example, when a new MAC address is added to fabric 108, a new distribution message can be sent to fabric 104 to add this new MAC to the data structure that stores the mapping between MAC addresses and fabric 108's label.

It is also possible to combine the data-plane and control-plane approaches. For example, an initial set of MAC-to-fabric-label mapping information for all the MAC addresses in fabric 108 can be obtained by the switches in fabric 104 via the control plane. When a switch in fabric 104 observes a packet with fabric 108's label as its source fabric label, and a MAC SA that is not currently stored in the mapping-information data structure, the switch can add this new MAC address to the existing group of MAC addresses mapped to fabric 108, and share this information with all the switches in fabric 104.

One important issue in designing a fabric architecture is how to prevent loops. Loops occur when a forwarding decision leads to the packet to be sent to a switch it has visited before. In some embodiments of the present invention, loops can be prevented by restricting the forwarding behavior of a switch. Specifically, within a fabric switch, a switch is precluded from forwarding a packet from a intra-fabric tunnel to another intro-fabric tunnel, or from an inter-fabric tunnel to another inter-fabric tunnel. A switch is allowed to forward packets between an inter-fabric tunnel and an intra-fabric tunnel, between an intra-fabric tunnel and an edge tunnel, and between an inter-fabric tunnel and an edge tunnel. A switch is also allowed to forward packets between two edge tunnels, since the switch might be coupled to two end hosts, and such forwarding can facilitate communication between these two end hosts.

Note that because it is expected that within a fabric a switch can reach any other switch with a direct intra-fabric tunnel, there is no need for forwarding packets between intra-fabric tunnels. Similarly, an inter-fabric tunnel is expected to connect two backbone nodees directly, and there is no need to forward packets from one inter-fabric tunnel to another.

Figure 1B:
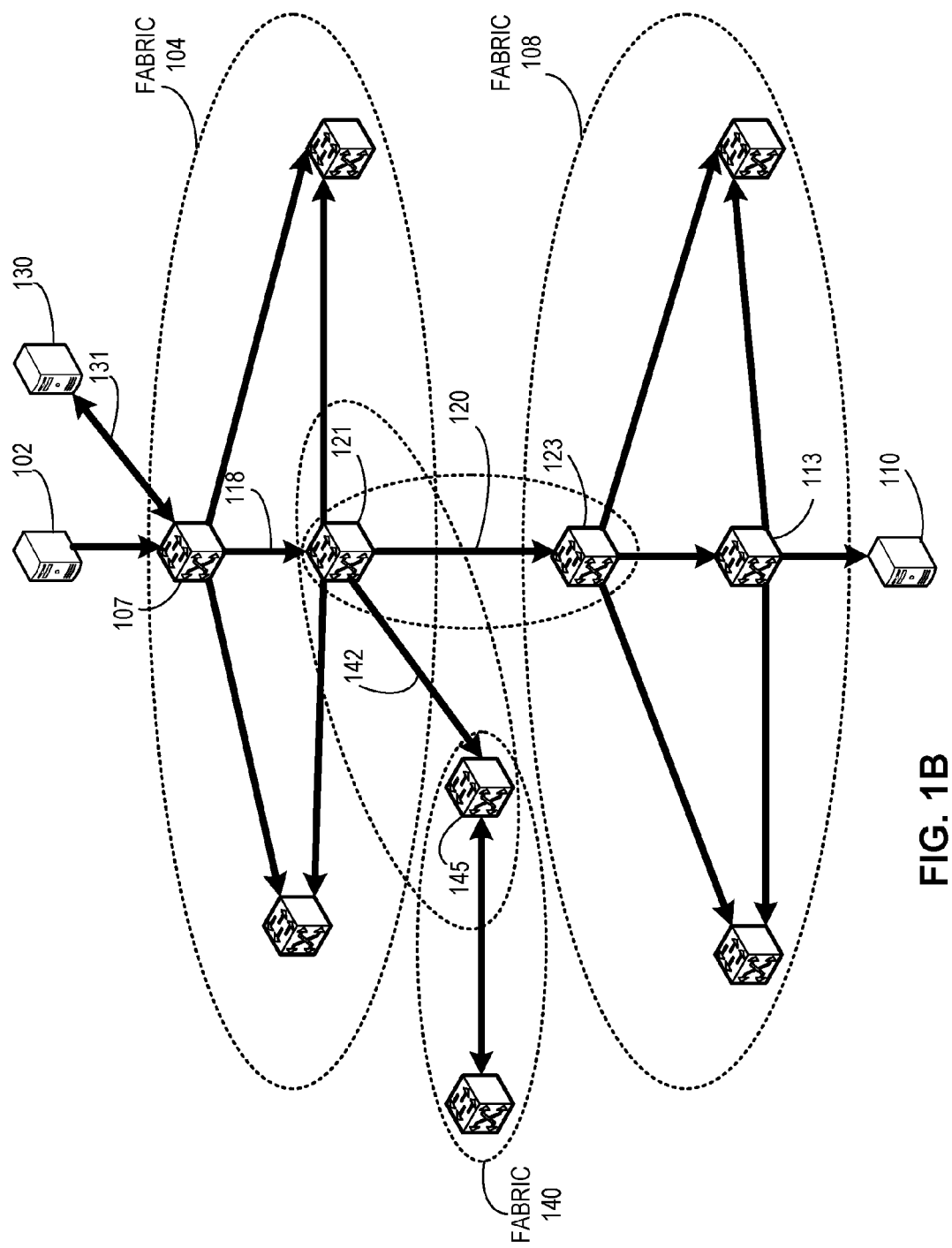
FIG. 1B illustrates an exemplary forwarding policy with hierarchical overlay tunnel groups, in accordance with an embodiment of the present invention.

FIG. 1B illustrates an exemplary forwarding policy with hierarchical overlay tunnel groups, in accordance with an embodiment of the present invention. In this example, switch 107 can forward a packet received from end host 102 to an intra-fabric tunnel, such as intra-fabric tunnel 118, which leads to backbone node 121. Switch 107 can also forward the packet to an end host 130 via another edge tunnel 131. It should be noted that a backbone node can participate in a plurality of edge fabrics and a backbone fabric. For example, backbone node 121 can also participate in another edge fabric 140.

After receiving the packet on intra-fabric tunnel, backbone node 121 can forward the packet onto inter-fabric tunnel 120. Here, backbone node 121 is precluded from forwarding the packet onto intra-fabric tunnels of fabric 104, which could lead to formation of loops. However, if the packet is a multi-destination packet, even though backbone node 121 does not forward the packet onto intra-fabric tunnels of fabric 104, backbone node 121 forwards the packet onto intra-fabric tunnels of fabric 140 (e.g., intra-fabric tunnel 142 between backbone node 121 and switch 145 of fabric 140).

Similarly, when backbone node 123 receives the packet, it can only forward the packet onto an intra-fabric switch, and is precluded from sending the packet to another inter-fabric switch.

Forwarding Information

Once a packet enters a fabric, it can be assumed that the packet usually travels along a link while being encapsulated in a tunnel header. This tunnel header can include a source fabric label and a destination fabric label. In one embodiment, this fabric label information is carried in a network service header (NSH). However, a switch in a fabric switch needs to determine which label to use while forwarding a packet.

During operation, a switch, such as switch 107 in FIG. 1A, receives forwarding information of fabric 104 via the control plane (e.g., from a management device). Such information can include a list of MAC addresses of end hosts (e.g., virtual machines and physical servers) coupled to fabric 104. The information also includes which MAC address is reachable via which switch in fabric 104. Similarly, switch 107 can also receive forwarding information of end hosts coupled to remote fabrics, which are coupled via backbone fabric 106 (e.g., fabric 108). However, the forwarding information associated with fabric 108 in switch 107 only indicates that these end hosts are reachable via backbone fabric 106. Switch 107 stores the forwarding information in a switch identifier mapping table.

Figure 1C:
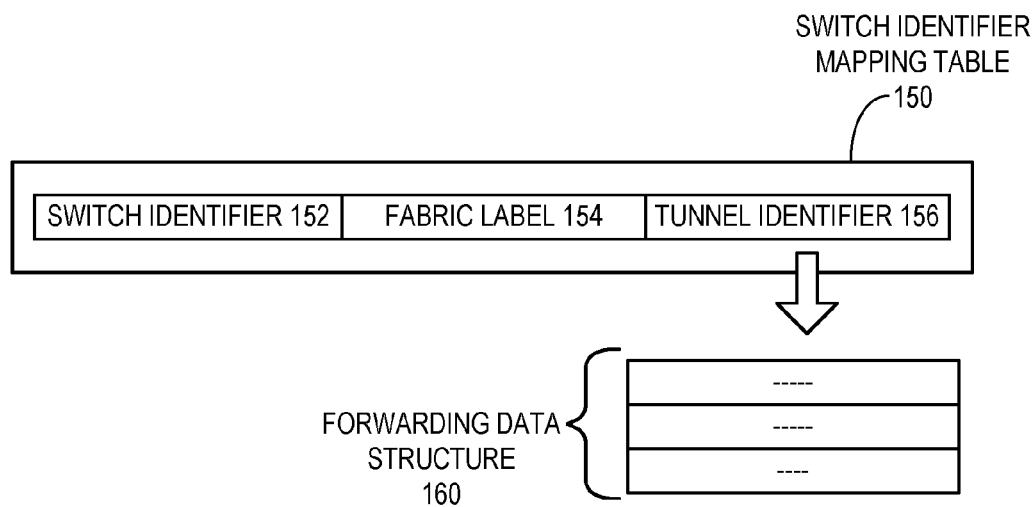
FIG. 1C illustrates an exemplary switch identifier mapping table, in accordance with an embodiment of the present invention.

FIG. 1C illustrates an exemplary switch identifier mapping table, in accordance with an embodiment of the present invention. In this example, an entry in switch identifier mapping table 150 maps switch identifier 152 with a fabric label 154 and a tunnel identifier 156. Switch identifier 152 can be a MAC address, an IP address, or both. The IP address can be obtained from an Address Resolution Protocol (ARP) response message. Tunnel identifier 156 can be an internal and local number of the switch storing table 150, such as an integer value stored in the forwarding hardware of the switch. In some embodiments, a respective backbone node sends a notification message to other switches in an edge fabric indicating that the backbone node is coupled to the backbone fabric. For example, upon receiving the notification message from backbone node 121, switch 107 associates fabric label of backbone 106 with the tunnel identifier of tunnel 118.

If switch identifier 152 is assigned to end host 101 and table 150 is in switch 111, fabric label 154 corresponds to fabric 108 and tunnel identifier 156 identifies intra-fabric tunnel between switches 111 and 113. On the other hand, backbone node 121 has notified switch 107 that backbone 106 is reachable via backbone node 121. Hence, if switch identifier 152 is assigned to end host 101 and table 150 is in switch 107, fabric label 154 corresponds to backbone fabric 106 and tunnel identifier 156 identifies intra-fabric tunnel 118 between switch 107 and backbone node 121.

In some embodiments, tunnel identifier 156 points to a forwarding data structure 160 (e.g., tunnel identifier 156 operates as the index of data structure 160). Forwarding data structure 160 includes any information that can be used to encapsulate a packet in a tunnel encapsulation header and forward the encapsulated packet via the tunnel identified by tunnel identifier 156. Information in forwarding data structure 160 include, but are not limited to, a destination identifier (e.g., VTEP IP address of the other end of the tunnel), an IP DHCP value, a list of VNI supported by the tunnel, one or more VLANs mapped to a respective VNI, an ARP response information, and an Ethernet priority value.

Figure 1D:
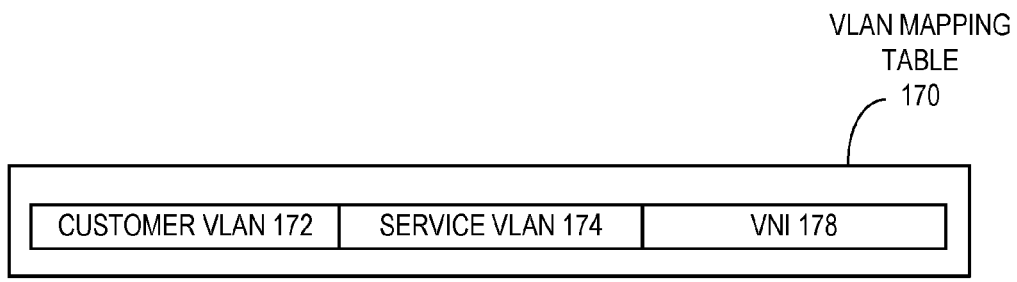
FIG. 1D illustrates an exemplary virtual local area network (VLAN) mapping table, in accordance with an embodiment of the present invention.

In some embodiments, the VLANs mapped to a VNI are stored in a separate table. FIG. 1D illustrates an exemplary VLAN mapping table, in accordance with an embodiment of the present invention. VLAN mapping table 170 includes an entry comprising a mapping between a customer VLAN 172 and a VNI 178. In some embodiments, VLAN mapping table 170 can further map service VLAN 174 to VNI 178. VLAN mapping table 170 can be maintained for a respective tunnel and the VNIs supported by the tunnel. VNI 178 can be mapped to one or more customer VLANs and/or one or more service VLANs. This allows a switch to segregate traffic from different clients or different VLANs in the tunnel.

Fabric Formation and MAC Address Management

Figure 2A:
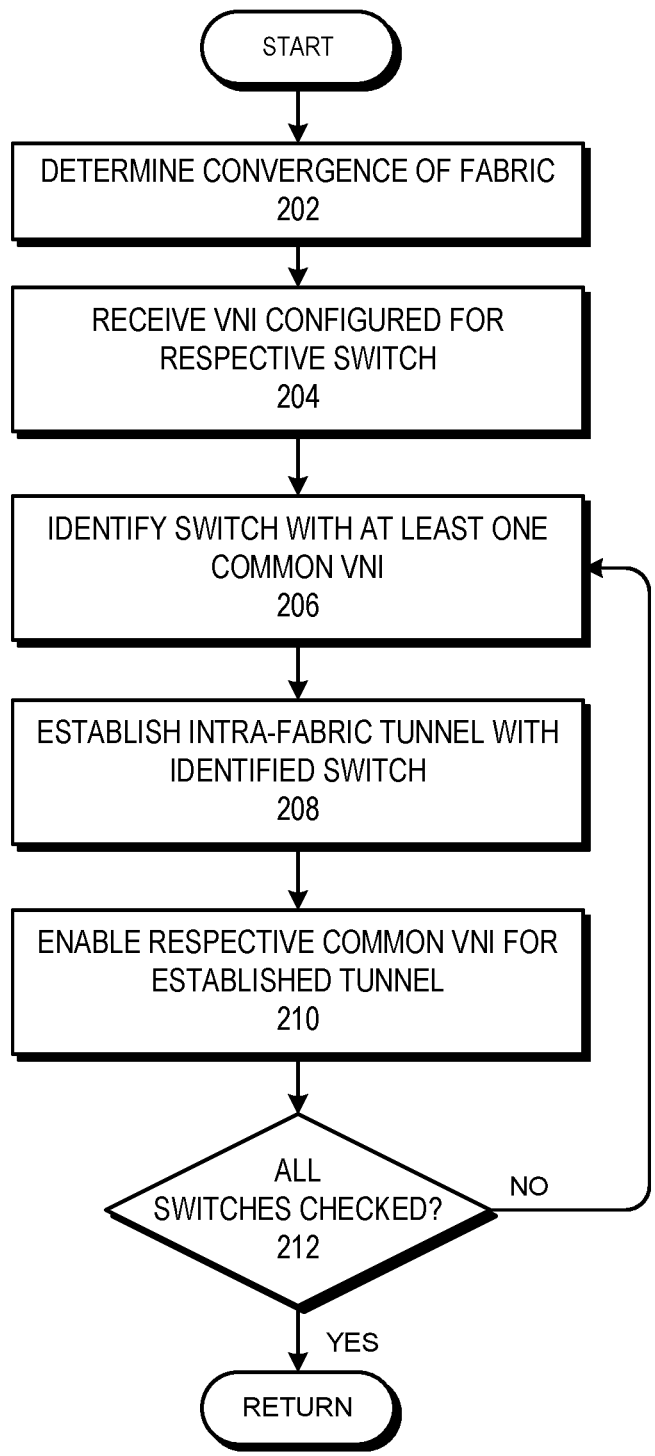
FIG. 2A presents a flowchart illustrating an exemplary process of a switch establishing intra-fabric tunnels in a fabric switch, in accordance with an embodiment of the present invention.

In the example of FIG. 1A, fabric 104 can be an IP network and a respective switch of fabric 104 runs BGP (or its variation) to determine routes among the switches. When the network converges, switches in fabric 104 have routes among the switches, and hence, establish intra-fabric tunnels in fabric 104. FIG. 2A presents a flowchart illustrating an exemplary process of a switch establishing intra-fabric tunnels in a fabric switch, in accordance with an embodiment of the present invention. During operation, the switch determines the convergence of the fabric (operation 202). The switch then receives the VNIs configured for a respective switch (operation 204). The switch can receive this information from notification messages from other switches or an administrative device (e.g., a network administrator's workstation).

The switch identifies a switch with at least one common VNI (operation 206) and establishes an intra-fabric tunnel with the identified switch (operation 208). The tunnel can be represented by the switch IP address of the identified switch (i.e., the VTEP identifier is the switch IP address). The switch can further generate (or receive) a local and internal tunnel identifier to identify the tunnel. The switch enables a respective common VNI for the established tunnel (operation 210). In this way, the same tunnel can be used for multiple VNIs. The switch then checks whether all switch are checked for common VNI (operation 212). If not, the switch continues to identify another switch with at least one common VNI (operation 206) and establish an intra-fabric tunnel with the identified switch (operation 208).

Figure 2B:
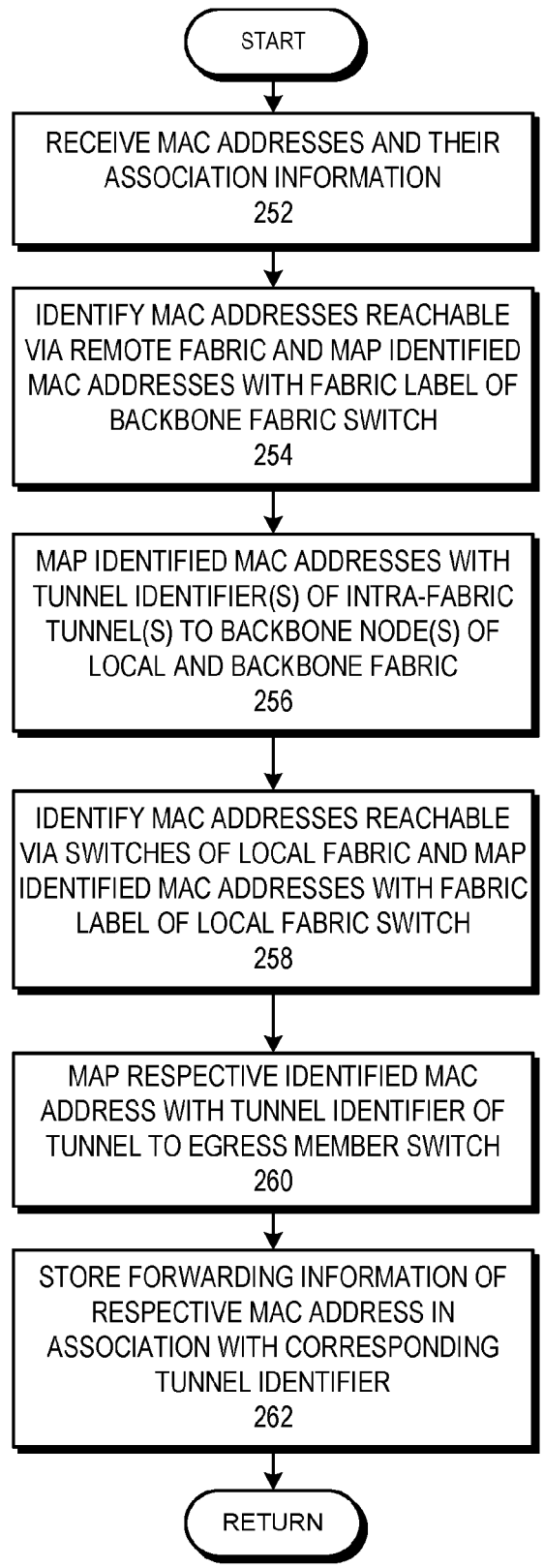
FIG. 2B presents a flowchart illustrating an exemplary process of a switch mapping switch identifiers to forwarding information, in accordance with an embodiment of the present invention.

FIG. 2B presents a flowchart illustrating an exemplary process of a switch mapping switch identifiers to forwarding information, in accordance with an embodiment of the present invention. During operation, the switch receives MAC addresses and their association destination information (operation 252), as described in conjunction with FIG. 1C. The switch identifies the MAC addresses reachable via a remote fabric and maps the identified MAC addresses with the fabric label of the backbone fabric (operation 254). The switch maps the identified MAC addresses with the tunnel identifier(s) of intra-fabric tunnel(s) to backbone node(s) of local and backbone fabric (operation 256). If the switch receives an ARP response for a MAC address, the switch includes the IP address associated with the MAC address in the mapping.

The switch then identifies the MAC addresses reachable via the switches of the local fabric and maps identified MAC addresses with the fabric label of the local fabric (operation 258). The switch maps a respective identified MAC address with the tunnel identifier of the tunnel to the egress switch for the MAC address (i.e., the tunnel via which the MAC address is reachable) (operation 260). The switch then stores the forwarding information (e.g., forwarding information in forwarding data structure 160) of a respective MAC address in association with the corresponding tunnel identifier (operation 262). For example, the switch uses the tunnel identifier as an index to the forwarding information, as described in conjunction with FIG. 1C.

Since a switch can store forwarding information of MAC addresses reachable via both local and remote fabric switches, the number of such MAC addresses can be significant. As a result, such a large number of MAC addresses are not feasible to store in the forwarding hardware (e.g., content-addressable memory (CAM)) of the switch. To solve this problem, the switch can store the forwarding information in a storage device of the switch and load the forwarding information in the forwarding hardware only if the switch is in communication with the MAC address. These MAC addresses can be referred to as conversational MAC addresses.

Figure 2C:
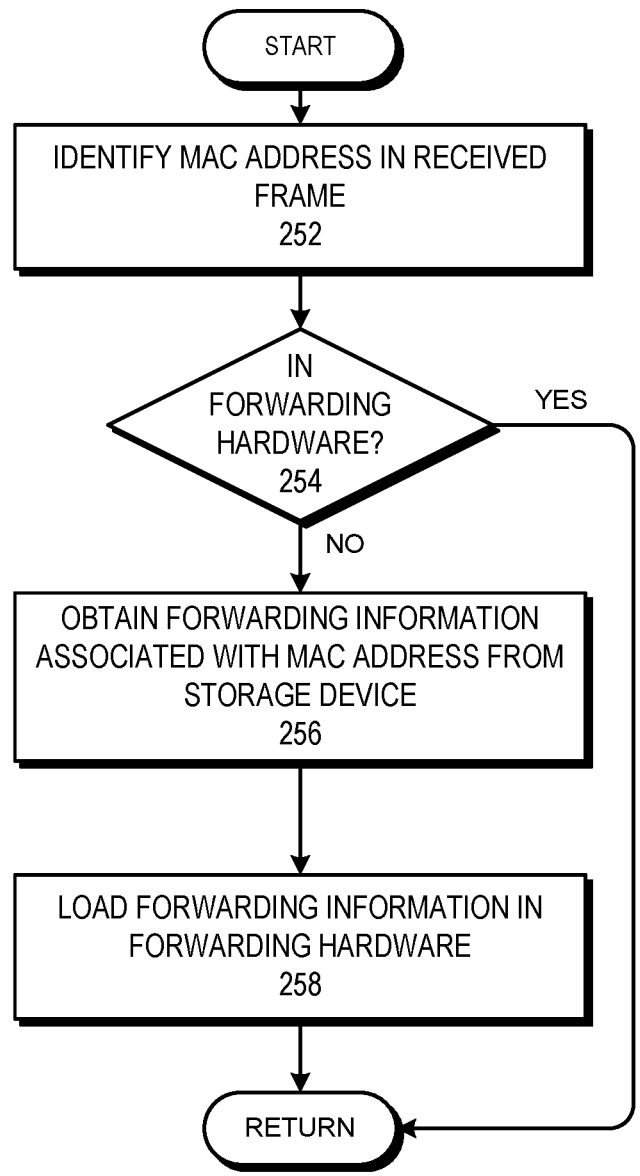
FIG. 2C presents a flowchart illustrating an exemplary process of a switch maintaining conversational MAC addresses in forwarding hardware, in accordance with an embodiment of the present invention.

FIG. 2C presents a flowchart illustrating an exemplary process of a switch maintaining conversational MAC addresses in forwarding hardware, in accordance with an embodiment of the present invention. During operation, the switch identifies a MAC address in a received frame (operation 252) and checks whether the MAC address is in the forwarding hardware of the switch (operation 254). If the MAC address is not in the forwarding hardware, the switch obtains the forwarding information associated with the MAC address from the storage device of the switch (operation 256) and loads the forwarding information in the forwarding hardware of the switch (operation 258).

Forwarding Information and Fabric Label

Figure 3A:
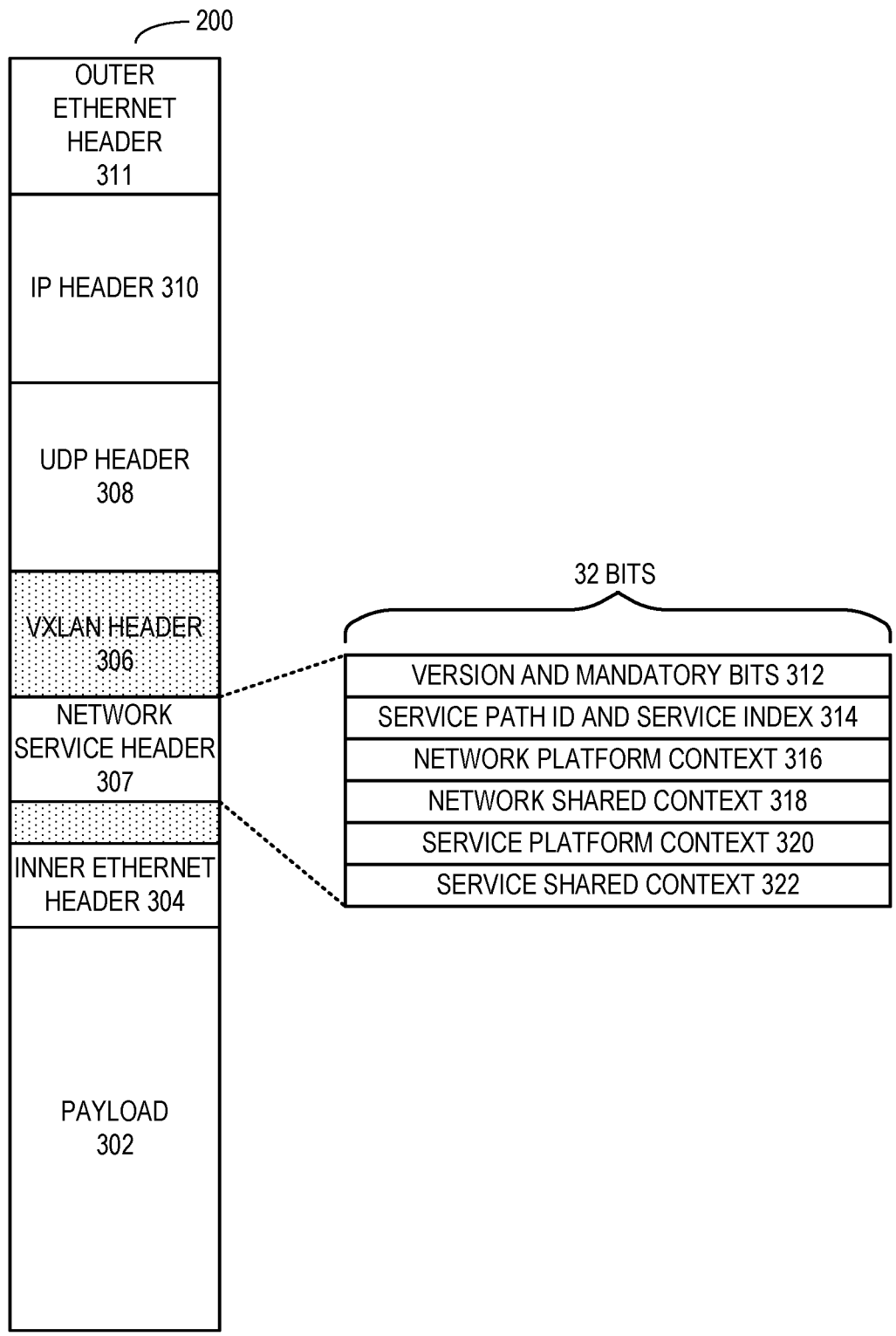
FIG. 3A illustrates an exemplary packet header configuration for carrying fabric switch identifier, in accordance with an embodiment of the present invention.

FIG. 3A illustrates an exemplary packet header configuration for carrying fabric switch identifier, in accordance with an embodiment of the present invention. In this example, it is assumed that the packet is encapsulated in a VXLAN tunnel header. As illustrated in FIG. 3A, a packet 300 includes a payload 302, which is carried in an Ethernet packet with an Ethernet header 304. This Ethernet packet is encapsulated in a VXLAN header 306, which includes a network service header 307.

Outside VXLAN header 306 is a UDP header 308, since VXLAN uses UDB as a transport-layer protocol. Outside UDP header 308 is an IP header 310. Note that the source and destination UDP ports, and source and destination IP addresses, can uniquely identify a VXLAN tunnel. A switch can maintain a data structure that maps intra-fabric MAC addresses to different intra-fabric tunnels using these tuples as unique tunnel identifiers.

Encapsulating IP header 310 is an outer Ethernet header 311, which serves as the actual data link layer protocol. Note that inner Ethernet header 304 serves a difference purpose from outer Ethernet header 311. Inner Ethernet header 304 indicates the end-to-end Ethernet forwarding path, whereas outer Ethernet header 311 is used as a hop-by-hop data link layer protocol.

Network service header 307 is typically 32 bit wide, and can include a number of fields, such as version and mandatory bits 312, a service path ID and service index field 314, a network platform context field 316, a network shared context field 318, a service platform context field 320, and a service shared context field 322. In one embodiment, network platform context field 316 can include a source fabric label and a destination fabric label, each of which can be 16-bit long.

Figure 3B:
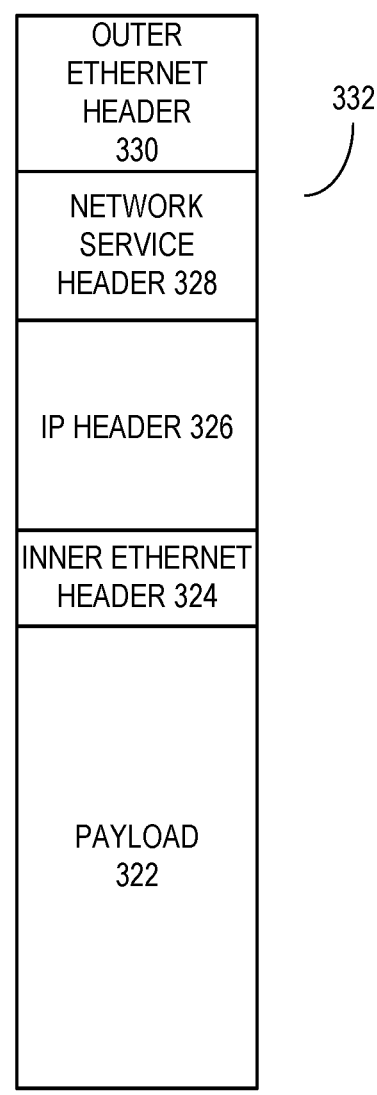
FIG. 3B illustrates an exemplary packet header configuration for carrying fabric switch identifier, in accordance with an embodiment of the present invention.

Note that the fabric label concept can also be used in a fabric architecture that uses other tunneling protocols, or does not use tunnel overlays. For example, a fabric switch can be built on IP forwarding without tunnels, and does not rely on any tunneling protocol. In this case, the fabric label information can be carried without any tunneling header. FIG. 3B illustrates an exemplary packet header configuration for carrying fabric switch identifier, in accordance with an embodiment of the present invention. In this example, a packet 332 includes a payload 322, which is carried in an Ethernet packet with an Ethernet header 324. This Ethernet packet is IP-encapsulated with an IP header 326. A network service header 328 is then placed outside IP header 326 to carry the source and destination fabric labels. An outer Ethernet header 330 is used to encapsulate the entire packet and serves as a data link layer header.

Figure 3C:
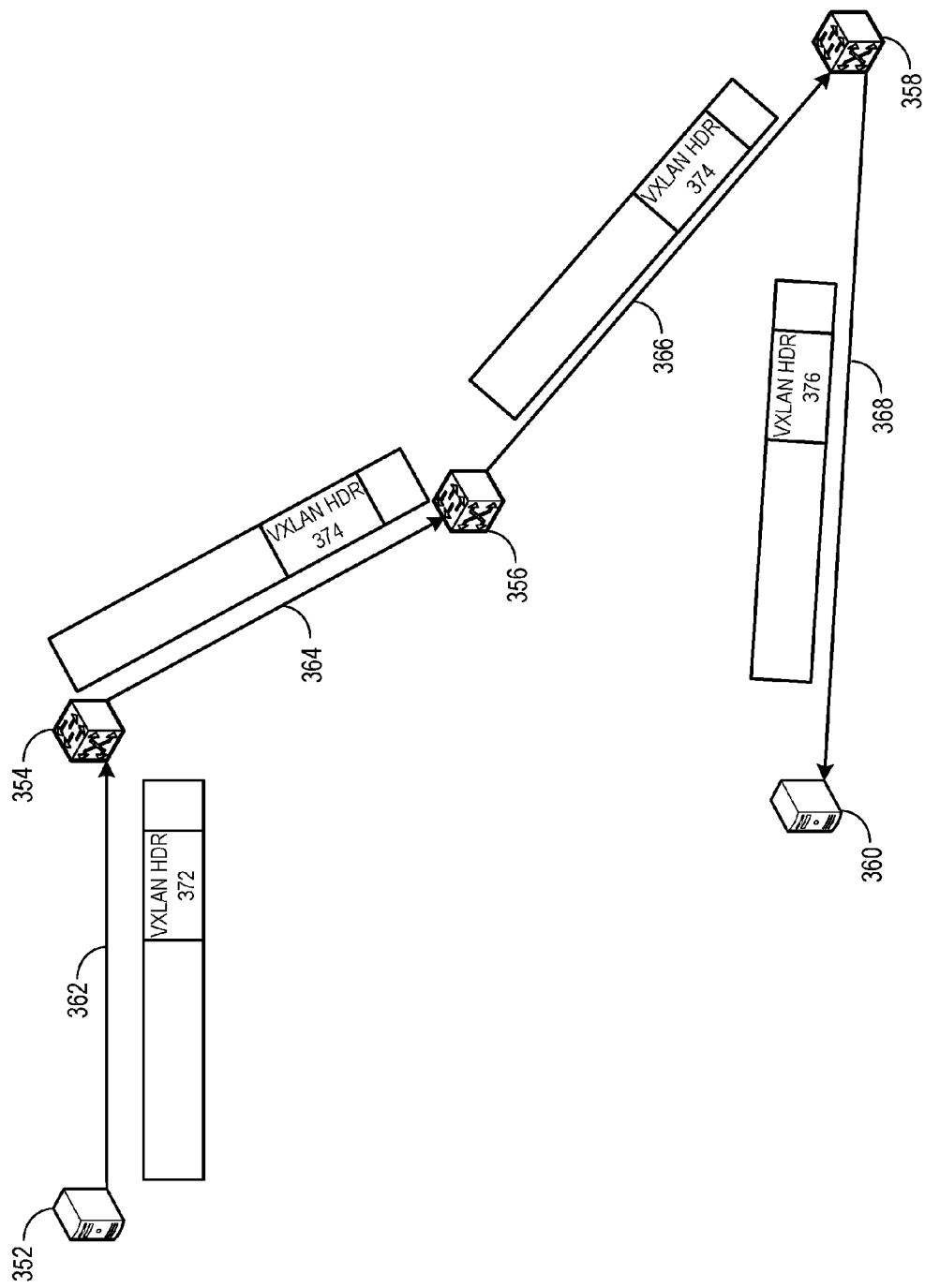
FIG. 3C illustrates an exemplary process of forwarding a packet from end to end across fabric switches, in accordance with an embodiment of the present invention.

FIG. 3C illustrates an exemplary process of forwarding a packet from end to end across fabric switches, in accordance with an embodiment of the present invention. In this example, an end host 352 is sending an Ethernet packet via two fabrics to an end host 360. During operation, end host 352 sends the packet via an edge tunnel 362 to an ingress fabric switch 354. The packet is encapsulated with a VXLAN header 372 while being transported in edge tunnel 312. Note that VXLAN header 372 does not include the source and destination fabric labels, because end host 352 is not part of a fabric.

After receiving and decapsulating the packet, switch 354 looks up the MAC DA of the inner Ethernet header, and based on the MAC DA determines the destination fabric label. In turn, switch 354 encapsulates the packet with a new tunnel header, which includes an IP header, a UDP header, and a VXLAN header 374. VXLAN header 374 includes a network service header that indicates the source fabric label and destination fabric label. Switch 354 then sends the encapsulated packet to a backbone node 306 via an intra-fabric tunnel 364. Note that VXLAN header 374 may share the same VXLAN network identifier (VNI) as VXLAN header 372.

Upon receiving and decapsulating the packet from intra-fabric tunnel 364, backbone node 356 determines that the packet is destined for a remote fabric based on its destination fabric label. As a result, switch 356 encapsulates the packet with a new tunnel header (i.e., IP and UDP headers) corresponding to inter-fabric tunnel 366, while retaining the same VXLAN header 304, including the network service header as part of VXLAN header 374. Note that by retaining the same VXLAN header 374, the packet retains the same source and destination fabric labels, which allow the packet to be forwarded through the fabrics.

Switch 356 then sends the packet onto an inter-fabric tunnel 366. Upon receiving and decapsulating the packet, remote backbone node 358 determines that the packet is destined to the fabric in which switch 358 resides, based on the packet's destination fabric label. As a result, switch looks up the MAC DA in the packet's inner Ethernet header. Assuming that the destination end host 360, which corresponds to the packet's MAC DA, is coupled to switch 358, switch 358 can encapsulate the packet with a new tunnel header (i.e., IP/UDP headers corresponding to end host 360), which includes a new VXLAN header 376. Note that VXLAN header 376 may have the same VNI as VXLAN header 374, but without a network service header, since end host 310 is not part of the fabric to which switch 358 belongs. Upon receiving this packet, end host 360 can decapsulate the packet from the tunnel header and process the inner Ethernet packet.

Forwarding Information and Fabric Label

Figure 4A:
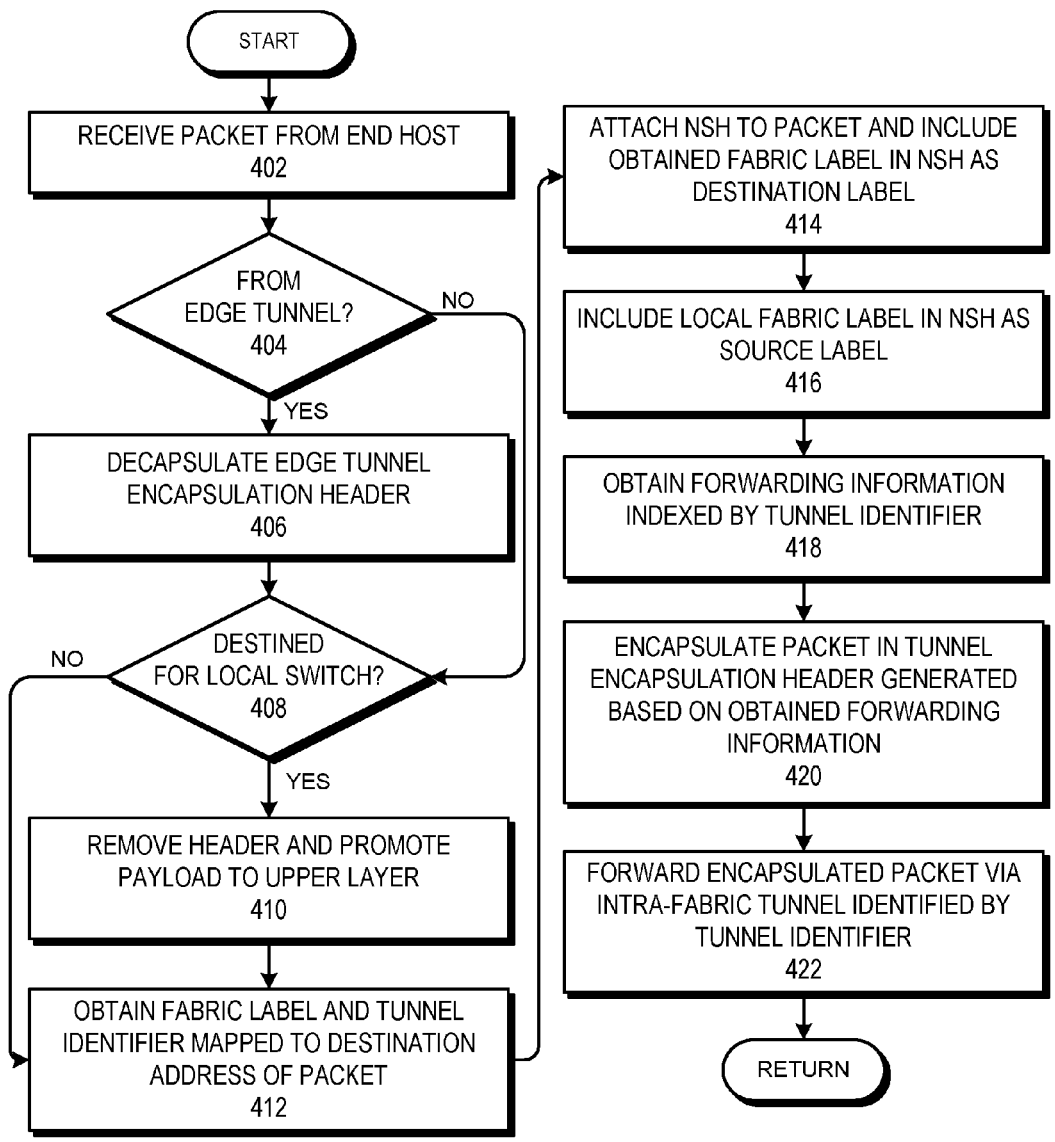
FIG. 4A presents a flowchart illustrating an exemplary process of a switch forwarding a packet received from an edge port, in accordance with an embodiment of the present invention.

FIG. 4A presents a flowchart illustrating an exemplary process of a switch forwarding a packet received from an edge port, in accordance with an embodiment of the present invention. During operation, the switch receives a packet from an end host (operation 402). The switch can receive this packet from an edge port or an edge tunnel. The switch checks whether the switch has received the packet from an edge tunnel (operation 404). If the switch has received the packet from an edge tunnel, the switch decapsulates the edge tunnel encapsulation header (operation 406). If the switch has not received the packet from an edge tunnel or has decapsulated the edge tunnel encapsulation header, the switch checks whether the packet is destined for the local switch (operation 408).

If the switch operates as an IP gateway for an end host, the switch can be the destination for the packet. The switch then removes the header of the packet (e.g., the Ethernet header) and promotes the payload (e.g., an inner IP packet) to the upper layer (e.g., for IP processing) (operation 410). The payload thus becomes the packet. If the packet is not destined for the local switch or upon promoting to the upper layer, the switch obtains the fabric label and tunnel identifier mapped to the destination address of the packet (operation 412), as described in conjunction with FIG. 1C. The switch attaches a NSH to the packet and includes the obtained fabric label in the NSH as the destination label (operation 414). The switch also includes the local fabric label in the NSH as the source label (operation 416).

The switch then obtains the forwarding information indexed by the tunnel identifier (operation 418) and encapsulates the packet in a tunnel encapsulation header generated based on the obtained forwarding information (operation 420), as described in conjunction with FIG. 1C. This forwarding information can include the source and destination VTEP IP addresses of the tunnel, and a MAC address of the next-hop switch. The switch then forwards the encapsulated packet via the inter-fabric tunnel identified by the tunnel identifier (operation 422).

Figure 4B:
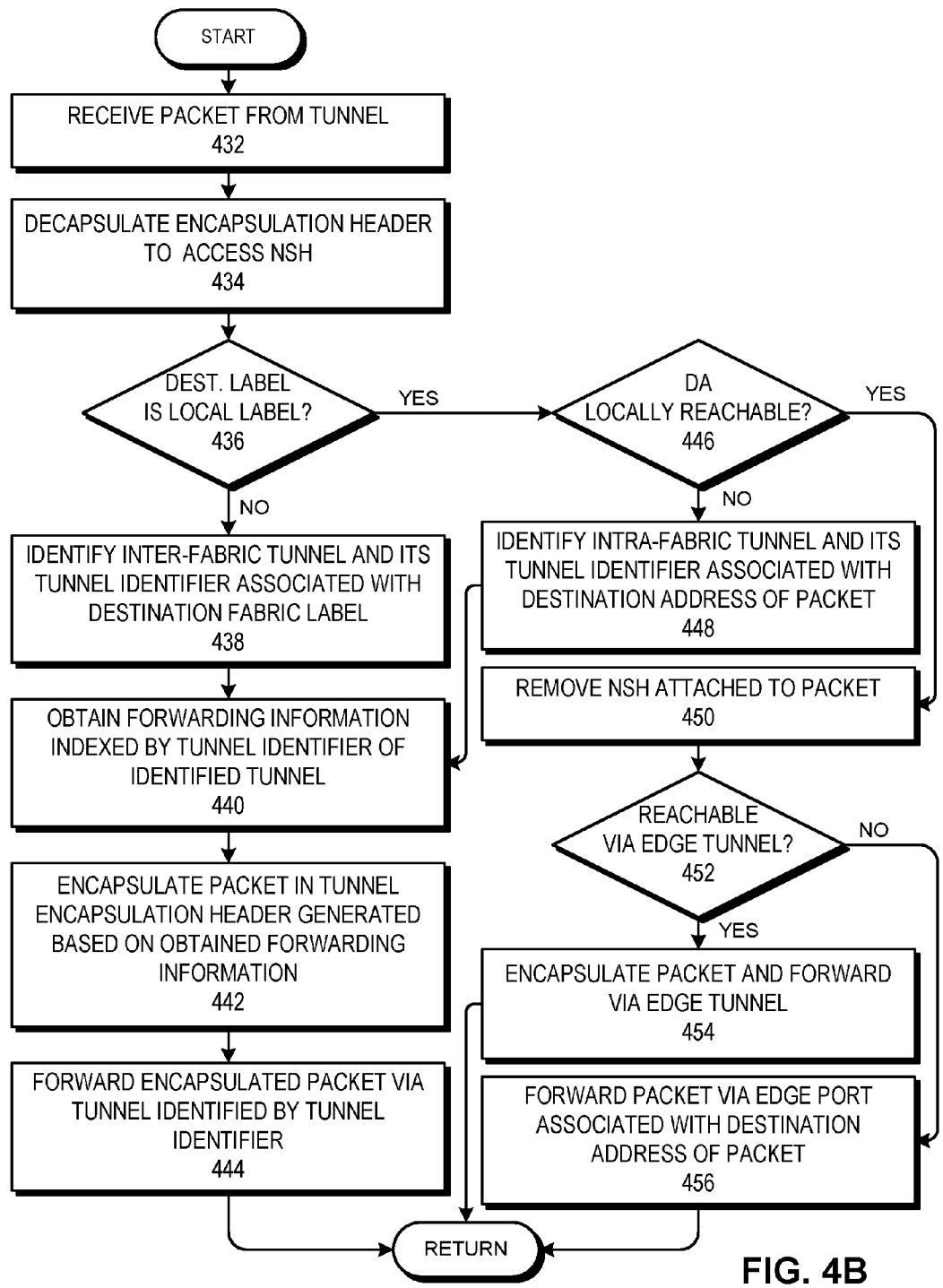
FIG. 4B presents a flowchart illustrating an exemplary process of a switch forwarding a packet received from a tunnel, in accordance with an embodiment of the present invention.

If the packet is destined to an end host reachable via a remote fabric, the switch forwards the packet to a backbone node. FIG. 4B presents a flowchart illustrating an exemplary process of a switch forwarding a packet received from a tunnel, in accordance with an embodiment of the present invention. During operation, the switch receives a packet via a tunnel (operation 432) and decapsulates encapsulation header to access the NSH of the packet (operation 434). The switch checks whether the destination label of the NSH is the local fabric label (operation 436).

If the destination label of the NSH is the local fabric label, the switch checks whether the destination address of the packet is locally reachable (operation 446). If the destination address is not locally reachable, the switch identifies an intra-fabric tunnel (i.e., the VTEP IP address) and its tunnel identifier associated with destination address of packet (operation 448). On the other hand, if the destination label of the NSH is not the local fabric label, the switch identifies an inter-fabric tunnel and its tunnel identifier associated with destination fabric label (operation 438).

Upon identifying an inter-fabric or intra-fabric tunnel for the packet (operation 438 or 448), the switch obtains the forwarding information indexed by the tunnel identifier of the identified tunnel (operation 440). The switch encapsulates the packet in a tunnel encapsulation header generated based on the obtained forwarding information (operation 442) and forwards the encapsulated packet via the tunnel identified by the tunnel identifier (operation 444).

If the destination address is locally reachable, the switch removes the NSH attached to the packet (operation 450) and checks whether the destination address of the packet is reachable via an edge tunnel (operation 452). If the destination address is reachable via an edge tunnel, the switch encapsulates the packet and forwards the encapsulated packet via the edge tunnel (operation 454). On the other hand, if the destination is not reachable via an edge tunnel, the switch forwards the packet via the edge port associated with the destination address of the packet (operation 456).

Figure 4C:
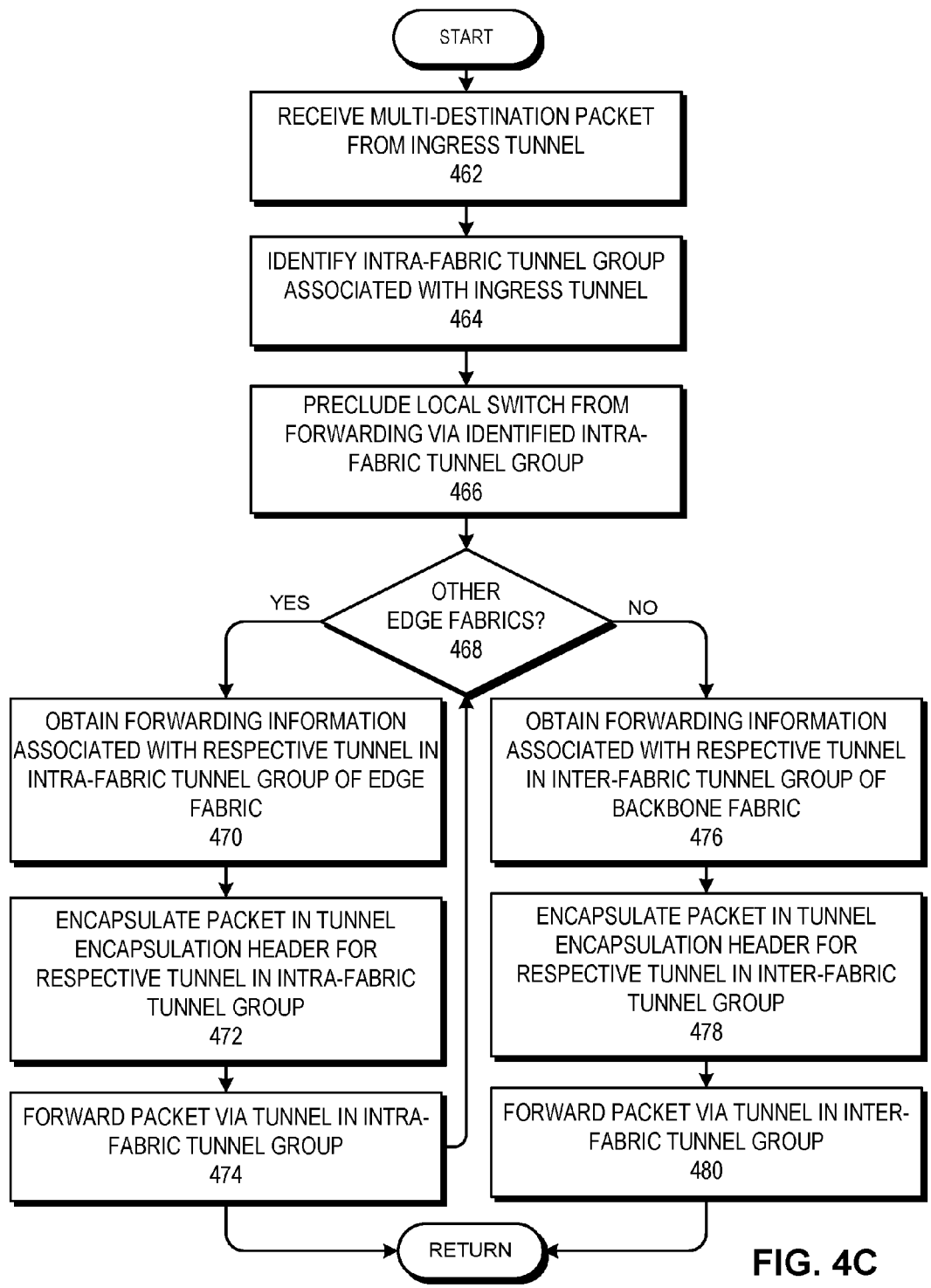
FIG. 4C presents a flowchart illustrating an exemplary process of a backbone node forwarding a multi-destination packet received from a tunnel, in accordance with an embodiment of the present invention.

FIG. 4C presents a flowchart illustrating an exemplary process of a backbone node forwarding a multi-destination packet received from a tunnel, in accordance with an embodiment of the present invention. A multi-destination packet can be a broadcast, multicast, or unknown unicast packet. During operation, the node receives a multi-destination packet via an ingress tunnel (operation 462) and identifies an intra-fabric tunnel group associated with the ingress tunnel (operation 464). The node then precludes the local switch from forwarding via the identified intra-fabric tunnel group (operation 466). The node determines whether the node is in other edge fabrics (i.e., the node determines whether the node is in other intra-fabric tunnel groups) (operation 468).

If the node is in other edge fabrics, the node obtains the forwarding information associated with a respective tunnel in the intra-fabric tunnel group of the edge fabric (operation 470). The node encapsulates the packet in a tunnel encapsulation header for a respective tunnel in the intra-fabric tunnel group (operation 472) and forwards the encapsulated packet via the tunnel in the intra-fabric tunnel group (operation 474). The node then continues to determine whether the node is in other edge fabrics (operation 468).

If the node is not in other edge fabrics, the node obtains the forwarding information associated with a respective tunnel in the inter-fabric tunnel group of the backbone fabric (operation 476). The node encapsulates the packet in a tunnel encapsulation header for a respective tunnel in the inter-fabric tunnel group (operation 478) and forwards the encapsulated packet via the tunnel in the inter-fabric tunnel group (operation 480).

Multi-Chassis Link Aggregation Group (MLAG)

Figure 5A:
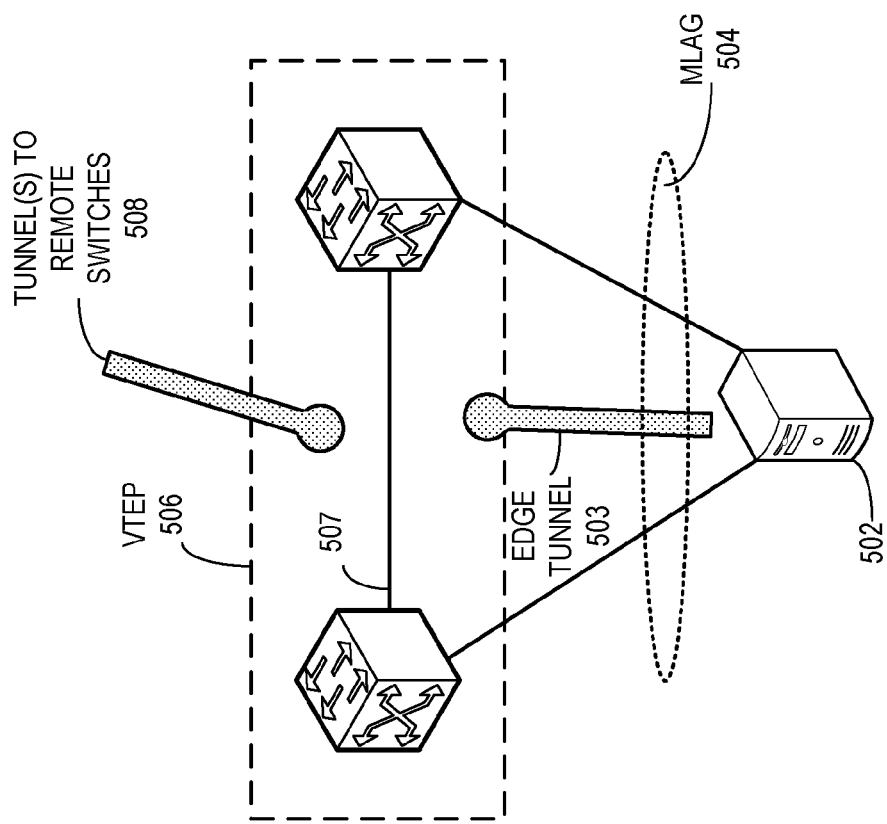
FIG. 5A illustrates an exemplary multi-chassis link aggregation group (MLAG) with a virtual tunnel endpoint, in accordance with an embodiment of the present invention.

FIG. 5A illustrates an exemplary MLAG with a virtual tunnel endpoint, in accordance with an embodiment of the present invention. In this example, an end host 502 is coupled to two separate switches that are members of a fabric. The two separate physical links form an MLAG 504. From end host 502's perspective, MLAG 504 behaves like a conventional link aggregation group (LAG), and end host 502 can use both physical links in MLAG 504 as if they are connected to the same switch. The switches in MLAG 504 can be referred to as partner switches.

Furthermore, the two physical switches form a VTEP 506, which optionally can be identified by a virtual IP address. An inter-switch link 507 can be used by these two switches to exchange state information, such that in case of a link failure, one switch can take over the traffic previously carried by the failed link. During operation, end host 502 can establish an edge VXLAN tunnel 503 with VTEP 506. Furthermore, VTEP 506 can establish an intra-fabric tunnel 508 to any other switch within the same fabric. Note that both edge tunnel 503 and intra-fabric tunnel 508 can use VTEP 506's virtual IP address as their source IP. In other words, VTEP 506 can present itself like another switch in the fabric.

When switches in VTEP 506 attaches an NSH to a packet received via MLAG 504, the switch includes an MLAG identifier of MLAG 504 as the source label in the NSH. This allows the receiving VTEP of tunnel 508 to determine that the packet is originally received via MLAG 504. For example, if a backbone node receives a packet, the node can determine that the packet is received from MLAG 504 based on the source label in the NSH. The node then replaces the MLAG identifier with the fabric label of the ingress edge fabric and forwards the packet via an inter-fabric tunnel.

In some embodiments, the fabric labels and MLAG identifiers are allocated from different ranges. As a result, the node can determine that the source label is an MLAG identifier. In some further embodiments, a backbone node maintains a mapping between the virtual IP address of VTEP 506 and the MLAG identifier. When the node identifies the virtual IP address as the source IP address of the encapsulation header of a packet, the node determines that the source label of the NSH of the packet is an MLAG identifier.

Figure 5B:
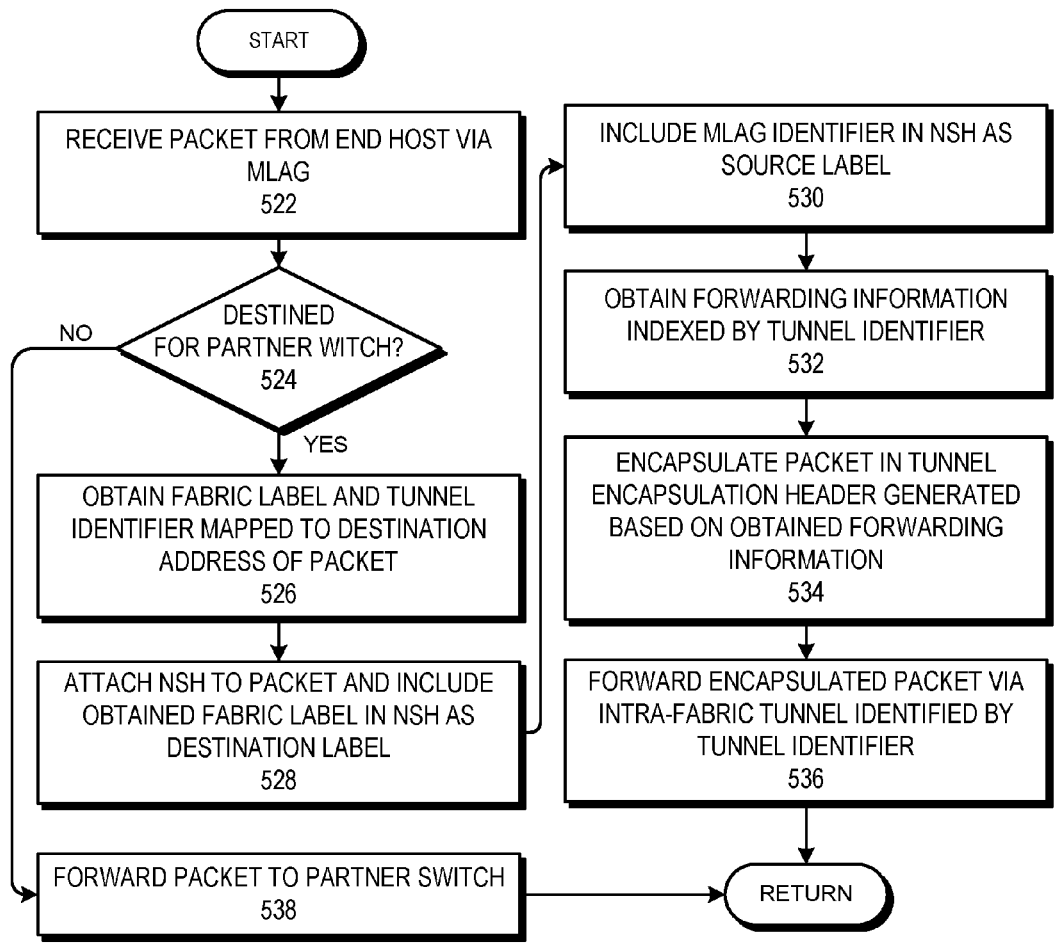
FIG. 5B presents a flowchart illustrating an exemplary process of a switch forwarding a packet received from an MLAG, in accordance with an embodiment of the present invention.

FIG. 5B presents a flowchart illustrating an exemplary process of a switch forwarding a packet received from an MLAG, in accordance with an embodiment of the present invention. During operation, the switch receives a packet from the end host via the MLAG (operation 522) and checks whether the packet is destined for a partner switch (operation 524). If the packet is destined for the partner switch, the switch forwards the packet to the partner switch (operation 538), as described in conjunction with FIG. 4A. If the packet is not destined for the partner switch, the switch obtains the fabric label and tunnel identifier mapped to the destination address of the packet (operation 526), as described in conjunction with FIG. 4A. The switch attaches an NSH to the packet and includes the obtained fabric label in the NSH as the destination label (operation 528).

The switch also includes the MLAG identifier in the NSH as the source label (operation 530). The switch then obtains the forwarding information indexed by the tunnel identifier (operation 532) and encapsulates the packet in a tunnel encapsulation header generated based on the obtained forwarding information (operation 534), as described in conjunction with FIG. 1C. This forwarding information can include the source and destination VTEP IP addresses of the tunnel, and a MAC address of the next-hop switch. The switch then forwards the encapsulated packet via the inter-fabric tunnel identified by the tunnel identifier (operation 536).

Figure 5C:
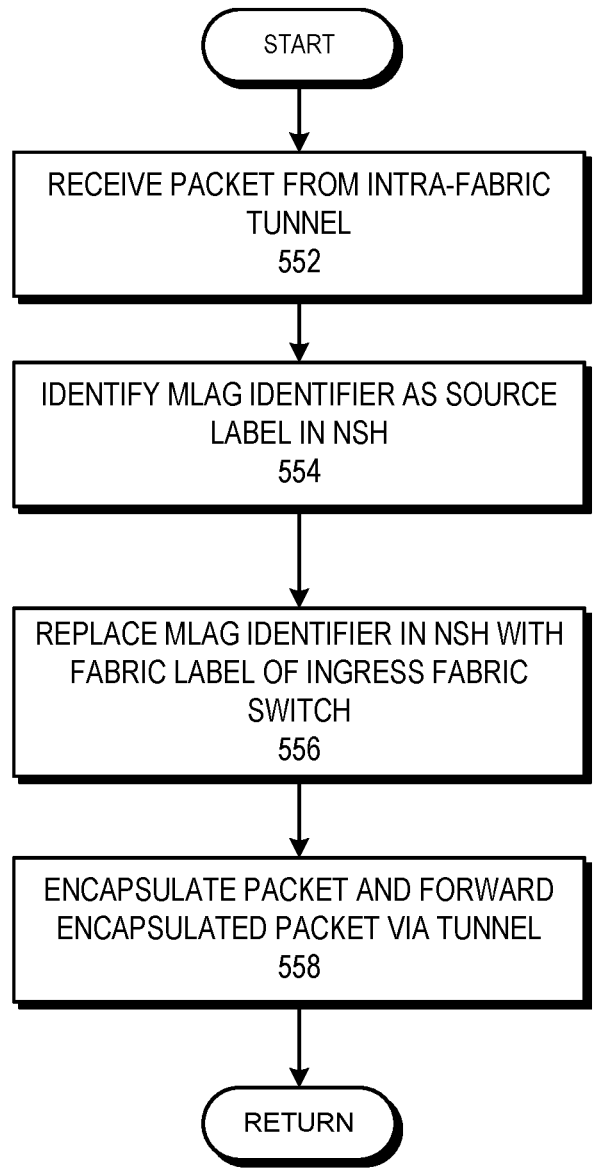
FIG. 5C presents a flowchart illustrating an exemplary process of a backbone node forwarding a packet with an MLAG identifier, in accordance with an embodiment of the present invention.

FIG. 5C presents a flowchart illustrating an exemplary process of a backbone node forwarding a packet with an MLAG identifier, in accordance with an embodiment of the present invention. During operation, the switch receives a packet from an intra-fabric tunnel (operation 552) and identifies an MLAG identifier as the source label in the NSH (operation 554). The switch then replaces the MLAG identifier in the NSH with the fabric label of the ingress fabric switch (operation 556). The switch encapsulates the packet and forwards the encapsulated packet via a tunnel (operation 558), as described in conjunction with FIG. 4B.

Hierarchical Overlay Tunnels

Figure 6:
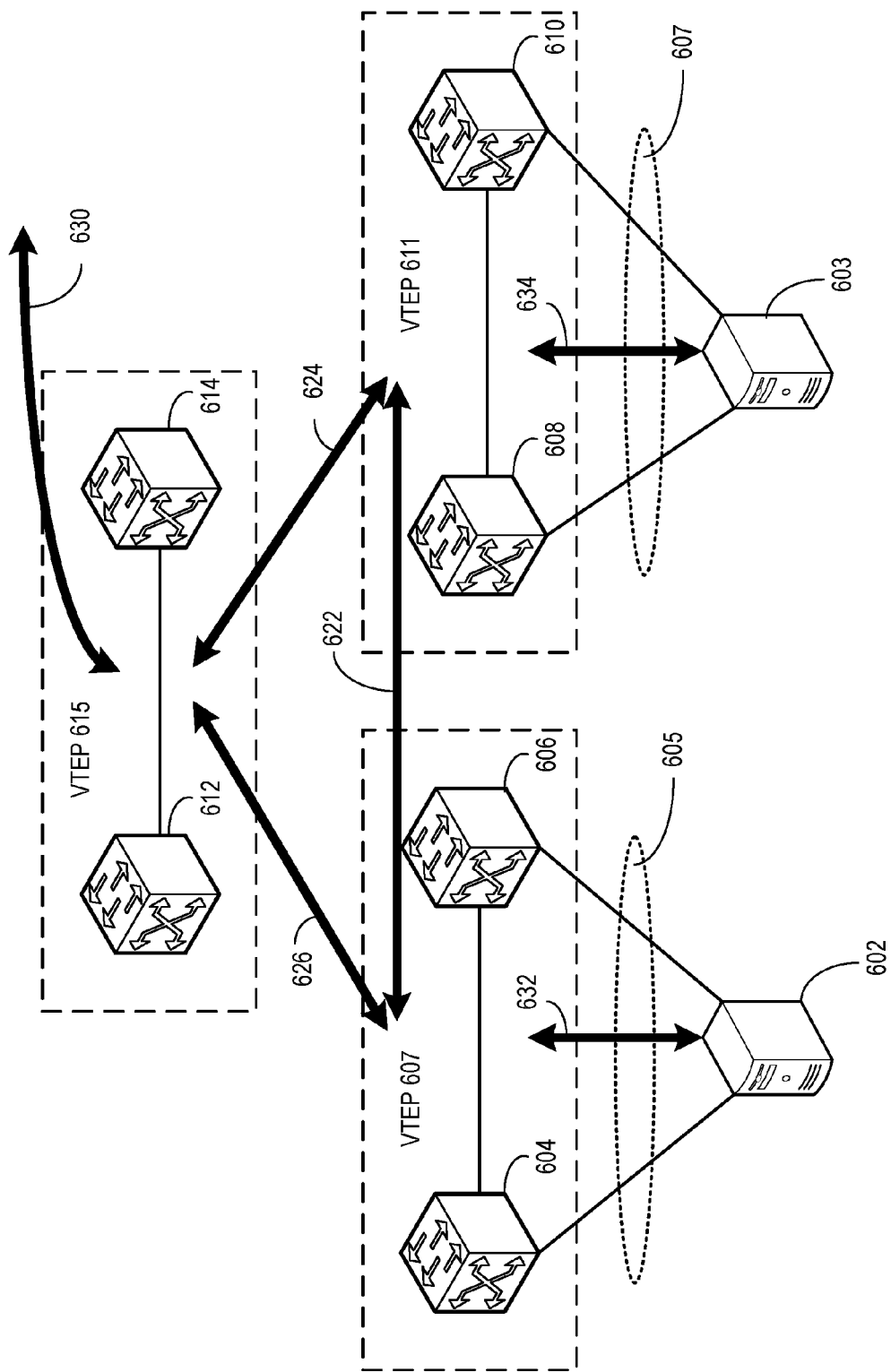
FIG. 6 illustrates an exemplary configuration of a fabric switch based on hierarchical overlay tunnels, in accordance with an embodiment of the present invention.

FIG. 6 illustrates an exemplary configuration of a fabric switch based on hierarchical overlay tunnels, in accordance with an embodiment of the present invention. In this example, a fabric includes three VTEPs 607, 611, and 615. VTEP 607 is formed by switches 604 and 606, VTEP 611 is formed by switches 608 and 610, and VTEP 615 is formed by switches 612 and 614. An end host 602 is coupled to VTEP 607 via an MLAG 603, which is based on links to switches 604 and 606. In general, end host 602 can communicate with VTEP 607 via an edge tunnel 632. Similarly, an end host 603 is coupled to VTEP 611 via an MLAG 607, which is based on links to switches 608 and 610. End host 603 can communicate with VTEP 611 via an edge tunnel 634. In this example, VTEPs 607, 611, and 615 can be considered as logical units, which form the fabric.

Within the fabric, all the VTEPs can form a fully meshed logical topology using intra-fabric tunnels. Specifically, an intra-fabric tunnel 626 is formed between VTEPs 607 and 615; an intra-fabric tunnel 622 is formed between VTEPs 607 and 611; and an intra-fabric tunnel 624 is formed between VTEPs 611 and 615. In addition, VTEP 615 serves as a gateway VTEP to the backbone network, and can maintain one or more inter-fabric tunnels, such as inter-fabric tunnel 630.

Exemplary Switch

Figure 7:
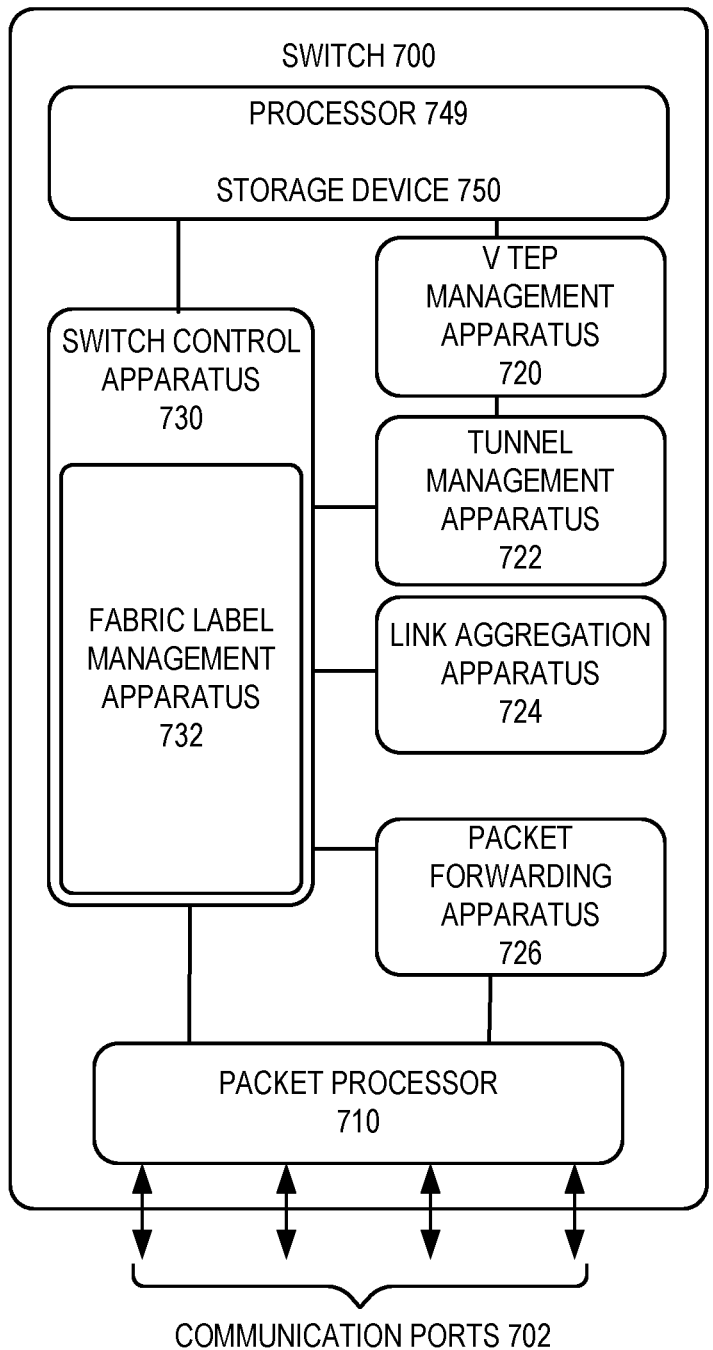
FIG. 7 illustrates an exemplary member switch in an IP-based fabric switch, in accordance with an embodiment of the present invention.

FIG. 7 illustrates an exemplary member switch in an IP-based fabric switch, in accordance with an embodiment of the present invention. In this example, a switch 700 can include a number of communication ports 702, a packet processor 710. Switch 700 also includes a processor 749, a storage device 750, a switch control apparatus 730, which includes a fabric label management apparatus 732. Switch 700 further includes a VTEP management apparatus 720, a tunnel management apparatus 722, a link aggregation apparatus 724, and a packet forwarding apparatus 726.

During operation, fabric label management apparatus is responsible for maintaining the mapping between MAC in a remote fabric and the corresponding remote fabric's label. In addition, switch control apparatus 730 is also responsible for maintaining a local MAC-to-VTEP mapping in the local fabric. VTEP management apparatus is responsible for maintaining the local VTEP state, such as obtaining and maintaining the virtual IP assigned to the VTEP, and mapping the VTEP's virtual IP to switch 700's own IP. Tunnel management apparatus 722 is responsible for maintaining the state of all edge, intra-fabric, and optionally inter-fabric tunnels. Specifically, tunnel management apparatus 722 can maintain a data structure that stores each tunnel's IP/UDP tuple information, and stores this data structure in storage device 750.

Link aggregation apparatus 724 is responsible for maintaining MLAGs with end hosts. Packet processor 710 is responsible for decapsulating and encapsulating packets. Packet forwarding apparatus 726 is responsible for determining what tunnel to use when forwarding a packet, and what headers to use before forwarding the packet onto an appropriate tunnel.

Note that aforementioned apparatuses can be implemented as instructions stored in storage device 750. When these instructions are executed by processor 749, they can cause the processor to perform one or more of the aforementioned methods.

To summarize, in embodiments of the present invention, the problem of building a versatile, cost-effective, and scalable layer-2 switching system is solved by forming a topology agnostic fabric switch based on an underlay layer-3 protocol with hierarchical overlay tunneling. This fabric switch architecture can include one or more fabric switches, interconnected by an underlay network that can be based on existing layer-3 and tunneling protocols, such as IP and VXLAN. Each fabric switch can include a number of physical switches, interconnected by a similar underlay network using the same layer-3 and tunneling protocols. The problem of handling a large number of MAC address in an extended layer-2 broadcast domain is solved by having a hierarchical tunneling mechanism and a label-based fabric-wise address aggregation mechanism.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
    tunnel circuitry configured to maintain a local inter-switch tunnel and an inter-fabric tunnel, wherein the inter-switch tunnel facilitates communication between the switch and a second switch in a first network of interconnected switches, and wherein the inter-fabric tunnel facilitates communication to a third switch in a second network of interconnected switches; and
    header circuitry configured to decapsulate a first encapsulation header of a packet received from the inter-switch tunnel and encapsulate the packet with a second encapsulation header for transmission over the inter-fabric tunnel, wherein the first and second encapsulation headers include a first and a second fabric identifiers, which identify the first and second networks of interconnected switches, respectively.

2. The switch of claim 1, wherein the tunnel circuitry is further configured to manage an edge tunnel, which facilitates communication between the switch and an end host.

3. The switch of claim 1, wherein the second fabric identifier in the second encapsulation header indicates a destination of the second encapsulation header.

4. The switch of claim 1, wherein the second encapsulation header includes a network service header.

5. The switch of claim 1, further comprising a storage device configured to store a data structure, which stores a mapping between a medium access control (MAC) address and a virtual tunnel endpoint.

6. The switch of claim 1, further comprising a storage device configured to store a data structure, which stores a mapping between a MAC address and the second fabric identifier.

7. The switch of claim 1, further comprising forwarding circuitry configured to preclude a second packet received from the inter-switch tunnel from being forwarded onto a second inter-switch tunnel between the switch and a fourth switch in the first network of interconnected switches.

8. The switch of claim 1, further comprising forwarding circuitry configured to load a MAC address in forwarding hardware of the switch in response to identifying the MAC address in a packet.

9. A method, comprising:
    maintaining a inter-switch tunnel and an inter-fabric tunnel, wherein the inter-switch tunnel facilitates communication between a switch and a second switch in a first network of interconnected switches, and wherein the inter-fabric tunnel facilitates communication to a third switch in a second network of interconnected switches;
    decapsulating a first encapsulation header of a packet received from the inter-switch tunnel; and
    encapsulating the packet with a second encapsulation header for transmission over the inter-fabric tunnel, wherein the first and second encapsulation headers include a first and a second fabric identifiers, which identify the first and second networks of interconnected switches, respectively.

10. The method of claim 9, further comprising managing an edge tunnel, which facilitates communication between the switch and an end host.

11. The method of claim 9, wherein the second fabric identifier in the second encapsulation header indicates a destination of the second encapsulation header.

12. The method of claim 9, wherein the second encapsulation header includes a network service header.

13. The method of claim 9, further comprising storing, in a storage device of the switch, a mapping between a medium access control (MAC) address and a virtual tunnel endpoint.

14. The method of claim 9, further comprising storing a mapping between a MAC address and the second fabric identifier.

15. The method of claim 9, further comprising precluding a second packet received from the inter-switch tunnel from being forwarded onto a second inter-switch tunnel between the switch and a fourth switch in the first network of interconnected switches.

16. The method of claim 9, further comprising loading a MAC address in forwarding hardware of the switch in response identifying the MAC address in a packet.

17. A computing system, comprising:
a processor;
a non-transitory computer-readable storage medium storing instructions which when executed by the processor causes the processor to perform a method, the method comprising:
  maintaining an inter-switch tunnel and an inter-fabric tunnel, wherein the inter-switch tunnel facilitates communication between the computing system and a second computing system in a first network of interconnected switches, and wherein the inter-fabric tunnel facilitates communication to a third computing system in a second network of interconnected switches;
  decapsulating a first encapsulation header of a packet received from the inter-switch tunnel; and
  encapsulating the packet with a second encapsulation header for transmission over the inter-fabric tunnel, wherein the first and second encapsulation headers include a first and a second fabric identifiers, which identify the first and second networks of interconnected switches, respectively.

18. The computing system of claim 17, wherein the method further comprises managing an edge tunnel, which facilitates communication between the computing system and an end host.

19. The computing system of claim 17, wherein the second fabric identifier in the second encapsulation header indicates a destination of the second encapsulation header.

20. The computing system of claim 17, wherein the second encapsulation header includes a network service header.

* * * * *